(12) United States Patent
Eisele

(10) Patent No.: US 11,396,317 B2
(45) Date of Patent: Jul. 26, 2022

(54) COVER FOR A SEAT CUSHION

(71) Applicant: Kathleen Anne Eisele, Oregon City, OR (US)

(72) Inventor: Kathleen Anne Eisele, Oregon City, OR (US)

( * ) Notice: Subject to any disclaimer, the term of this patent is extended or adjusted under 35 U.S.C. 154(b) by 188 days.

(21) Appl. No.: 16/799,437

(22) Filed: Feb. 24, 2020

(65) Prior Publication Data

US 2021/0261182 A1    Aug. 26, 2021

(51) Int. Cl.
| | | |
|---|---|---|
| *B62B 5/08* | (2006.01) | |
| *B60N 2/28* | (2006.01) | |
| *B60N 2/30* | (2006.01) | |

(52) U.S. Cl.
CPC ............ *B62B 5/082* (2013.01); *B60N 2/2881* (2013.01); *B60N 2/30* (2013.01)

(58) Field of Classification Search
None
See application file for complete search history.

(56) References Cited

U.S. PATENT DOCUMENTS

| | | | | |
|---|---|---|---|---|
| 4,324,430 | A | | 4/1982 | Dimas et al. |
| 4,416,462 | A | | 11/1983 | Thompson |
| 4,695,092 | A | * | 9/1987 | Hittie ........................ B60N 2/60 |
| | | | | 297/181 |
| D294,099 | S | * | 2/1988 | Bromberg ...................... 297/229 |
| 5,112,104 | A | * | 5/1992 | De Giacomi ............ B60N 2/60 |
| | | | | 297/229 |
| 5,137,335 | A | * | 8/1992 | Marten ................. A47D 15/006 |
| | | | | 297/181 |
| 5,147,109 | A | * | 9/1992 | Jolly ..................... B60N 2/6036 |
| | | | | 297/181 |
| 5,330,250 | A | * | 7/1994 | Reyes ..................... B62B 3/144 |
| | | | | 297/229 |
| 5,551,749 | A | * | 9/1996 | Reher ....................... A47D 1/00 |
| | | | | 297/181 |
| 5,641,200 | A | * | 6/1997 | Howell ................... B62B 3/144 |
| | | | | 280/33.993 |
| 5,855,412 | A | | 1/1999 | Smith et al. |
| | | | | (Continued) |

FOREIGN PATENT DOCUMENTS

CA          2665450 A1 * 12/2010     ............. B62B 3/144

OTHER PUBLICATIONS

Non-Final Office Action dated Jul. 18, 2019 in U.S. Appl. No. 16/043,605, 7 pages.

(Continued)

*Primary Examiner* — David E Allred
(74) *Attorney, Agent, or Firm* — Perkins Coie LLP

(57) ABSTRACT

Introduced here is a lightweight, foldable seat cushion which can be placed in the shopping cart seat to support a child's legs, and prevent the hard surfaces of the shopping cart, such as bars, from causing discomfort to the child and causing the child to try to get out of the cart. A seat cover can be temporarily attached to the seat cushion. The seat cover can be elastic to allow insertion of the seat cushion. The seat cover can have an image affixed to the seat cover, where the different sections of the seat cover form different sections of the image, such as body and legs. The seat cover can provide friction against the seat cushion, enabling a user to climb out of the seat cushion without sliding.

19 Claims, 24 Drawing Sheets

(56) References Cited

U.S. PATENT DOCUMENTS

| | | | | |
|---|---|---|---|---|
| 5,941,599 | A * | 8/1999 | Roberts | A47C 27/086 297/181 |
| 5,988,744 | A * | 11/1999 | Franchak | A47D 15/006 297/219.12 |
| 6,126,240 | A * | 10/2000 | Tse | A47D 1/00 297/228.11 |
| 6,164,721 | A | 12/2000 | Latshaw et al. | |
| 6,224,152 | B1 | 5/2001 | Hughes et al. | |
| D460,278 | S * | 7/2002 | Harshman | D6/333 |
| 6,582,017 | B1 | 6/2003 | Barnes et al. | |
| 6,851,749 | B2 | 2/2005 | Norman | |
| 7,029,066 | B1 * | 4/2006 | Myers-Jones | B62B 3/1456 297/229 |
| 7,367,621 | B1 * | 5/2008 | Han-Dressor | B62B 3/144 297/219.12 |
| 7,559,104 | B1 * | 7/2009 | Kahrig | A47D 13/08 446/72 |
| 8,152,236 | B1 * | 4/2012 | Romero | A47D 1/10 297/230.11 |
| 9,365,136 | B2 * | 6/2016 | Strmiska | B60N 2/2851 |
| 9,610,869 | B1 * | 4/2017 | Holley, Jr. | B60N 2/2851 |
| 10,351,153 | B2 | 7/2019 | Lopez | |
| 10,518,795 | B1 | 12/2019 | Eisele | |
| 10,858,025 | B2 | 12/2020 | Eisele | |
| 11,173,937 | B2 | 11/2021 | Eisele | |
| 2003/0205920 | A1 * | 11/2003 | Sprouse, II | A47C 7/021 297/219.1 |
| 2003/0205922 | A1 | 11/2003 | Norman | |
| 2005/0082886 | A1 * | 4/2005 | Sganga | A47D 15/006 297/219.1 |
| 2005/0110315 | A1 * | 5/2005 | Littlehorn | B60N 2/2812 297/219.12 |
| 2005/0127624 | A1 * | 6/2005 | Cohen-Fyffe | B62B 3/144 280/33.993 |
| 2007/0052277 | A1 * | 3/2007 | Smulders | B60N 2/286 297/484 |
| 2008/0252108 | A1 * | 10/2008 | Nakagome | A47D 15/006 297/129 |
| 2009/0140563 | A1 * | 6/2009 | Placide | A47C 31/11 297/224 |
| 2011/0012404 | A1 | 1/2011 | Cariera | |
| 2012/0201998 | A1 * | 8/2012 | Mandawewala | D06N 7/0073 428/95 |
| 2013/0264852 | A1 * | 10/2013 | Zack | A47C 31/11 297/219.12 |
| 2018/0312186 | A1 | 11/2018 | Lopez | |

OTHER PUBLICATIONS

Notice of Allowance dated Aug. 25, 2021 in U.S. Appl. No. 17/087,298, 9 pages.

* cited by examiner

COVER FOR A SEAT CUSHION

TECHNICAL FIELD

The present application is related to a seat cushion, and more specifically to methods and systems that enable safe and comfortable seating of a child in a shopping cart.

BACKGROUND

Caregivers can place children of various ages from a 1-year-old to a preschooler, in a seat of a shopping cart while browsing in a store. The children can get uncomfortable, become fidgety, try to sit sideways in the seat, and can even stand up in an attempt to climb out of the shopping cart seat. The shopping cart can move, and the child can fall over. An infant can fall from the cart and go head first to the pavement.

SUMMARY

Introduced here is a lightweight, foldable seat cushion which can be placed in the shopping cart seat to support a child's legs, and prevent the hard surfaces of the shopping cart, such as bars, from causing discomfort to the child and causing the child to try to get out of the cart. The seat cushion can attach to the cart using an attachment mechanism such as magnets and/or clasping protrusions, thus preventing the movement of the seat within the cart. The seat cushion can fold for easy storage in a diaper bag. The lightweight and compact size of the seat cushion makes the carrying of the seat cushion convenient and effortless.

A seat cover can be temporarily attached to the seat cushion. The seat cover can be elastic to allow insertion of the seat cushion. The seat cover can have an image affixed to the seat cover, where the different sections of the seat cover form different sections of the image, such as body and legs. The seat cover can provide friction against the seat cushion, enabling a user to climb out of the seat cushion without sliding.

DETAILED DESCRIPTION

Seat Cushion

Introduced here is a lightweight, foldable seat cushion which can be placed in the shopping cart seat to support a child's legs, and prevent the hard surfaces of the shopping cart, such as bars, from causing discomfort to the child and causing the child to try to get out of the cart. The seat cushion can attach to the cart using an attachment mechanism such as magnets and/or clasping protrusions, thus preventing the movement of the seat within the cart. The seat cushion can fold for easy storage in a diaper bag. The lightweight, and the compact size of the seat cushion makes the carrying of the seat cushion convenient and effortless.

Figure 1:
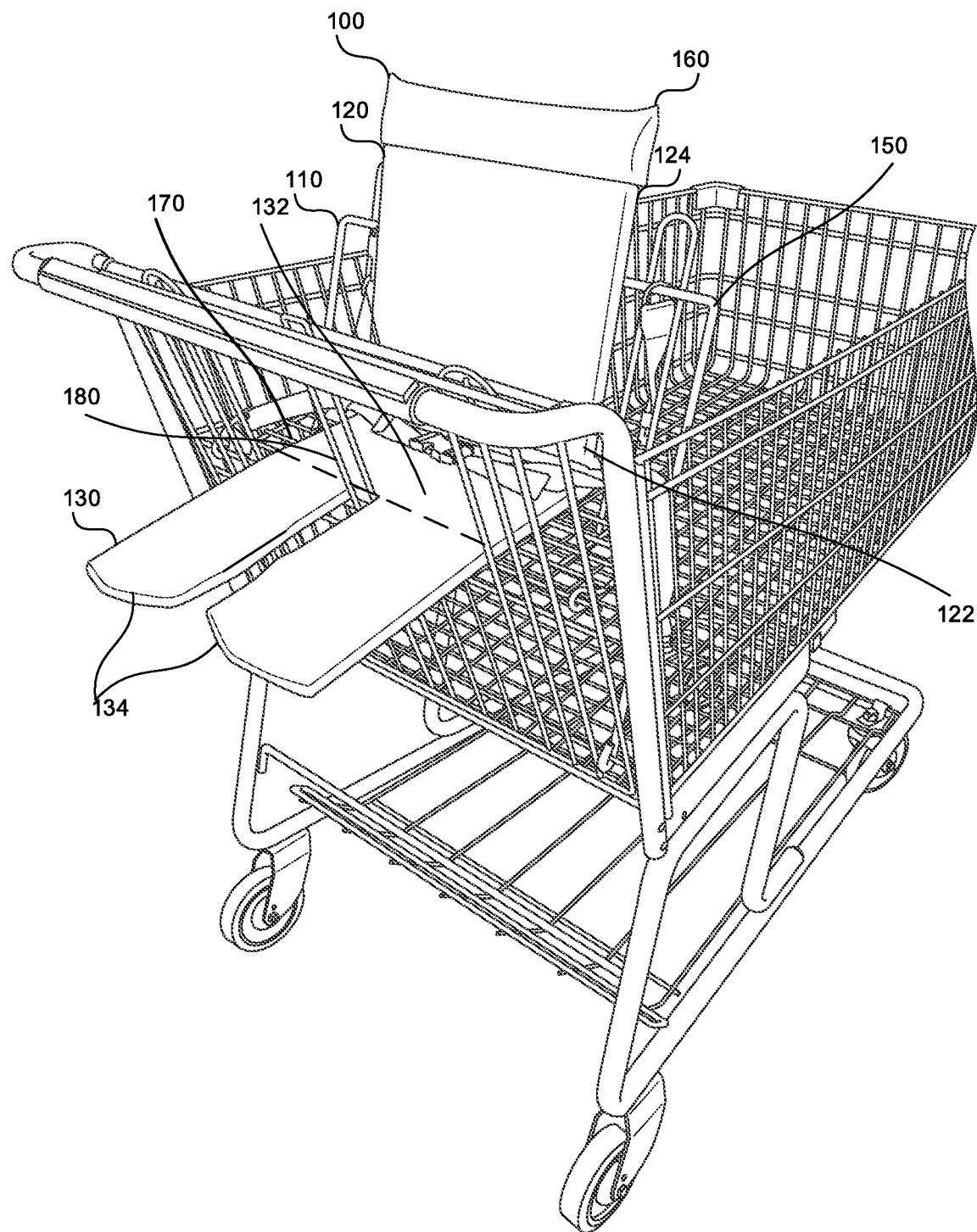
FIG. 1 shows a seat cushion placed upon and readily separable from a shopping cart.
Figure 2:
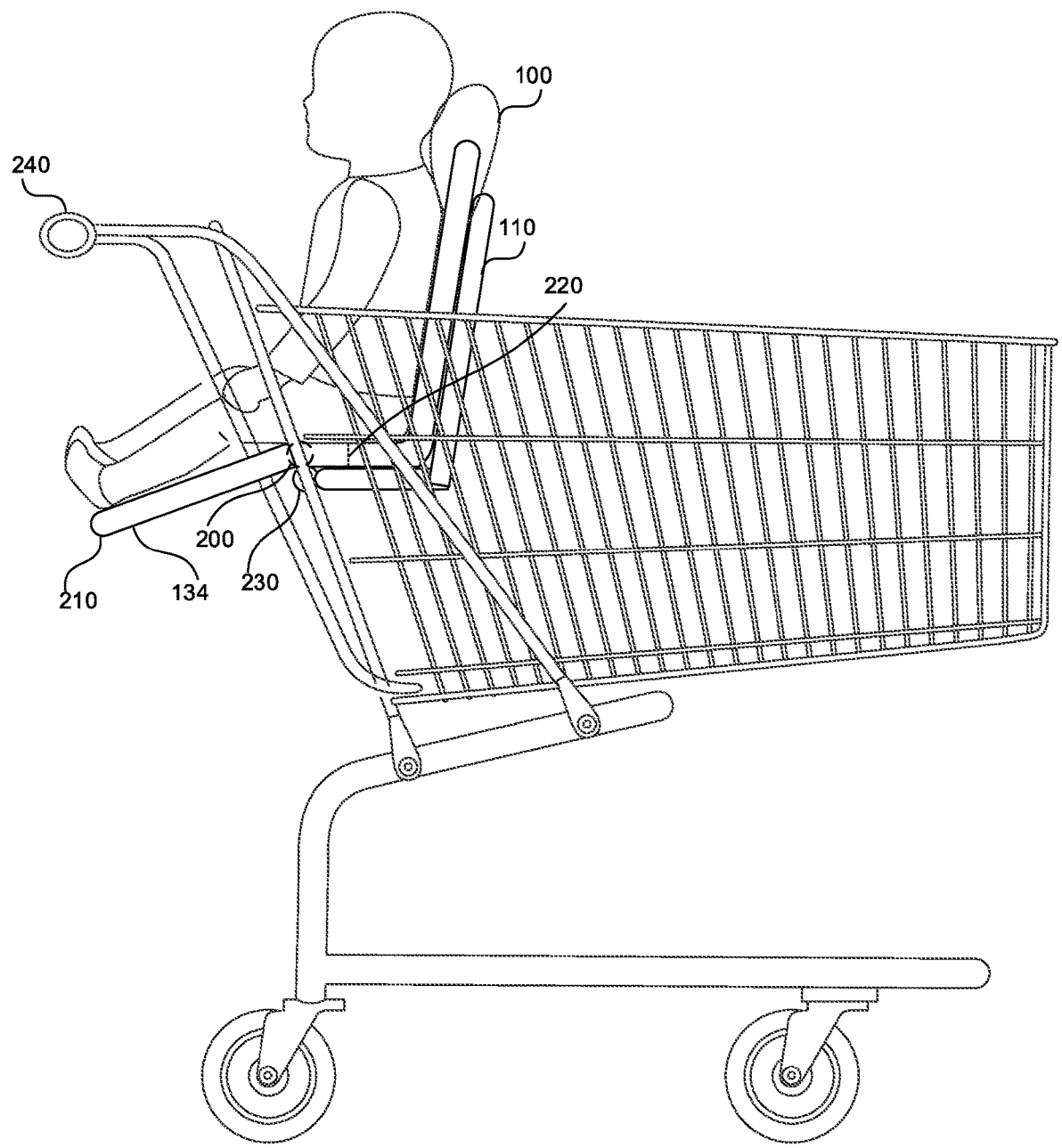
FIG. 2 shows a child seated within the seat cushion.

FIG. 1 shows a seat cushion placed upon and readily separable from a shopping cart. The seat cushion 100 provides a comfortable seat for a child sitting in the shopping cart seat 110, as shown in FIGS. 2, 4, by providing a safe and soft environment reducing the likelihood that the child will attempt to get out of the cart. The seat cushion 100 can include a backrest 120, a seat 130, and an attachment mechanism (not shown) to secure the seat cushion 100 to the shopping cart seat 110. The seat cushion 100 can be made of lightweight materials so that the total weight of the seat cushion does not exceed two pounds.

The backrest 120 can lean against a first support member, i.e., the backrest 150, of the shopping cart seat 110. The backrest can have a proximal end 122 and a distal end 124, where the distal end 124 includes a headrest 160. The headrest 160 can have an enlarged thickness, larger than the thickness of the backrest 120. Both the backrest 120 and the headrest 160 can include a cushioning layer such as high-density foam, gel cushion, ethyl vinyl acetate, etc.

The seat 130 can lean against a second support member, i.e., the seat 170, of the shopping cart. The seats 130 can include a back portion 132 hingedly joined to the proximal end 122 of the backrest 120 and a front portion formed into two prongs 134 defining a gap surrounding a leg separator 180 of the shopping cart seat 110. The two prongs 134 can support legs of a user, such as a child, as shown in FIGS. 2, 4 when the child is seated in the seat cushion 100. The two prongs 134 can support the legs of a child in substantially horizontal position, i.e., +/−10° away from the horizontal, or the two prongs 134 can bend when supporting the legs of the user.

The attachment mechanism can be attached to the backrest 120 and/or the seat 130 coupled to the backrest. The attachment mechanism can secure the seat cushion 100 to the shopping cart seat 110.

FIG. 2 shows a child seated within the seat cushion 100. When the child is seated within the seat cushion 100, the two prongs 134 of the seat can bend between 0 and 90° from horizontal. FIG. 2 shows the two prongs 134 bending approximately 30° from horizontal at a pivot 200. The pivot 200 is the point at which the seat cushion 100 touches the shopping cart seat 110. Using the action of the lever, the strongest force on the two prongs 134 is at the distal end 210 of the prongs 134. Consequently, the distal end 210 of the prongs 134 bends the farthest around the pivot 200. The thickness 220 of the seat cushion 100 protects the child's legs from the hard bars 230 of the shopping cart seat 110. As can be seen in FIG. 2, in one embodiment, the seat cushion 100 does not extend past the handlebar 240 of the shopping cart seat 110. That way, the seat cushion 100 does not interfere with the person pushing the cart. In another embodiment, the seat cushion 100 can extend up to 2 inches past the handlebar 240 of the shopping cart seat 110 to minimize the interference with the person pushing the cart.

Figure 3A:
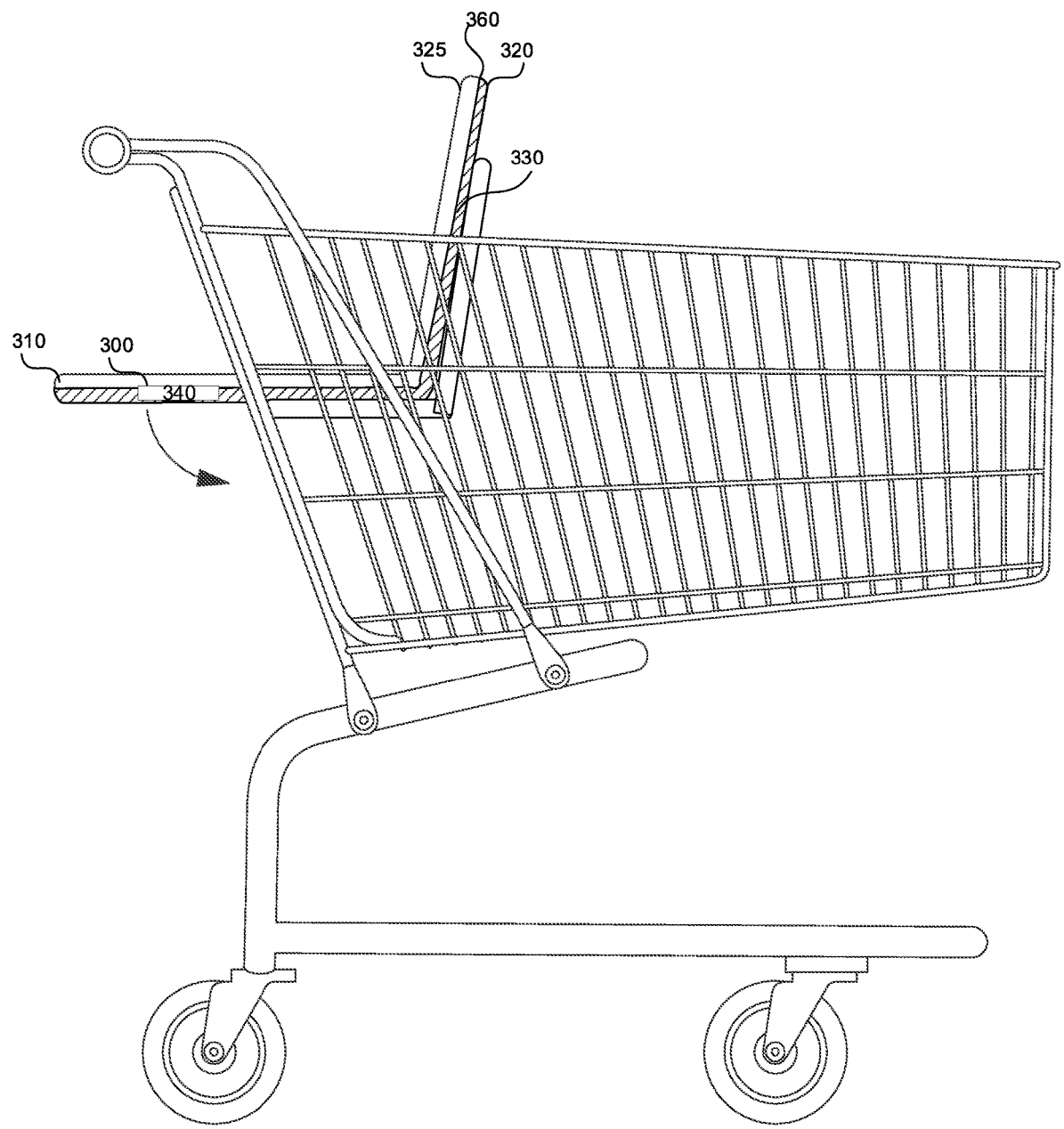
FIGS. 3A-3B show the two prongs of the bottom layer of the seat cushion having a medial region different from the remainder of the two prongs.
Figure 3B:
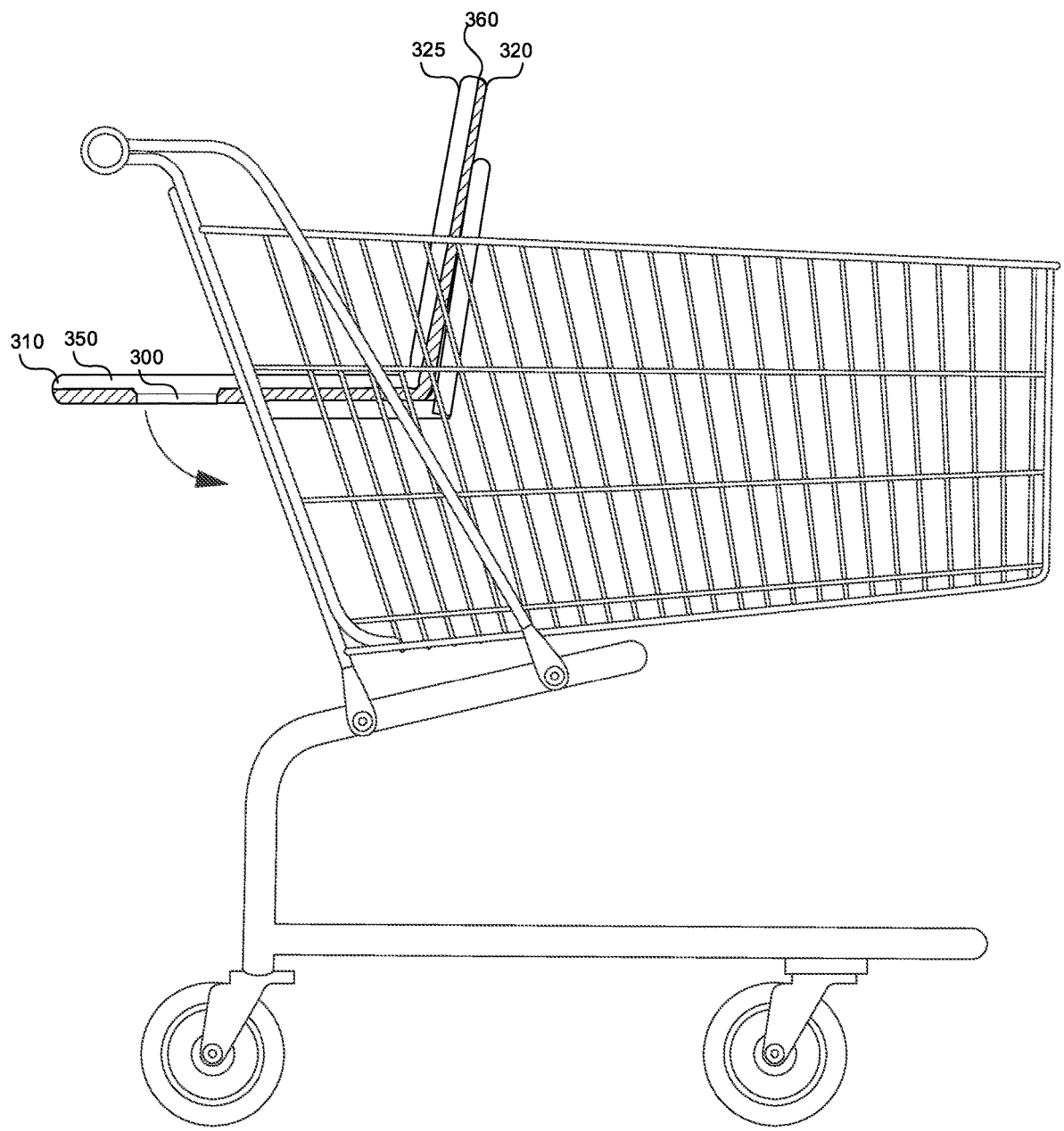

FIG. 3A-3B shows the two prongs of the bottom layer of the seat cushion having a medial region different from the remainder of the two prongs. The seat cushion 360 can include a bottom layer 320 which is made from a different material than the top layer 325. In one embodiment, the two prongs 310 of the bottom layer 320 of the seat cushion 360 can be made of single material as shown in FIG. 2. The single material can be a firm layer that can bend slightly under the weight of the child's legs as explained in this application.

In FIG. 3A, the medial region 300 of the two prongs 310 of the bottom layer 320 can be made of a second material 340, while the rest of the two prongs 310 are made of the first material 330. The first material 330 can be firmer than the second material 340. The first material 330 can be a polyethylene structural foam, polyurethane structural foam, an ethyl vinyl acetate, etc. The second material 340 can be a softer material such as low-density polyethylene structural foam, low-density polyurethane structural foam, low-density ethyl vinyl acetate, cushion high-density foam, ethyl vinyl acetate, or a gel cushion, etc.

In FIG. 3B, the medial region 300 of the two prongs 310 of the bottom layer 320 can be thinner than the rest of the bottom layer 320. As a result, the medial region 300 can be softer than the rest of the bottom layer 320, and can bend under the weight of the child's legs. The material contained in the medial region 300 can be the same as the material contained in the rest of the bottom layer 320. The gap 350 formed by the medial region 300 can be filled in with a cushioning layer as described in this application.

Figure 3C:
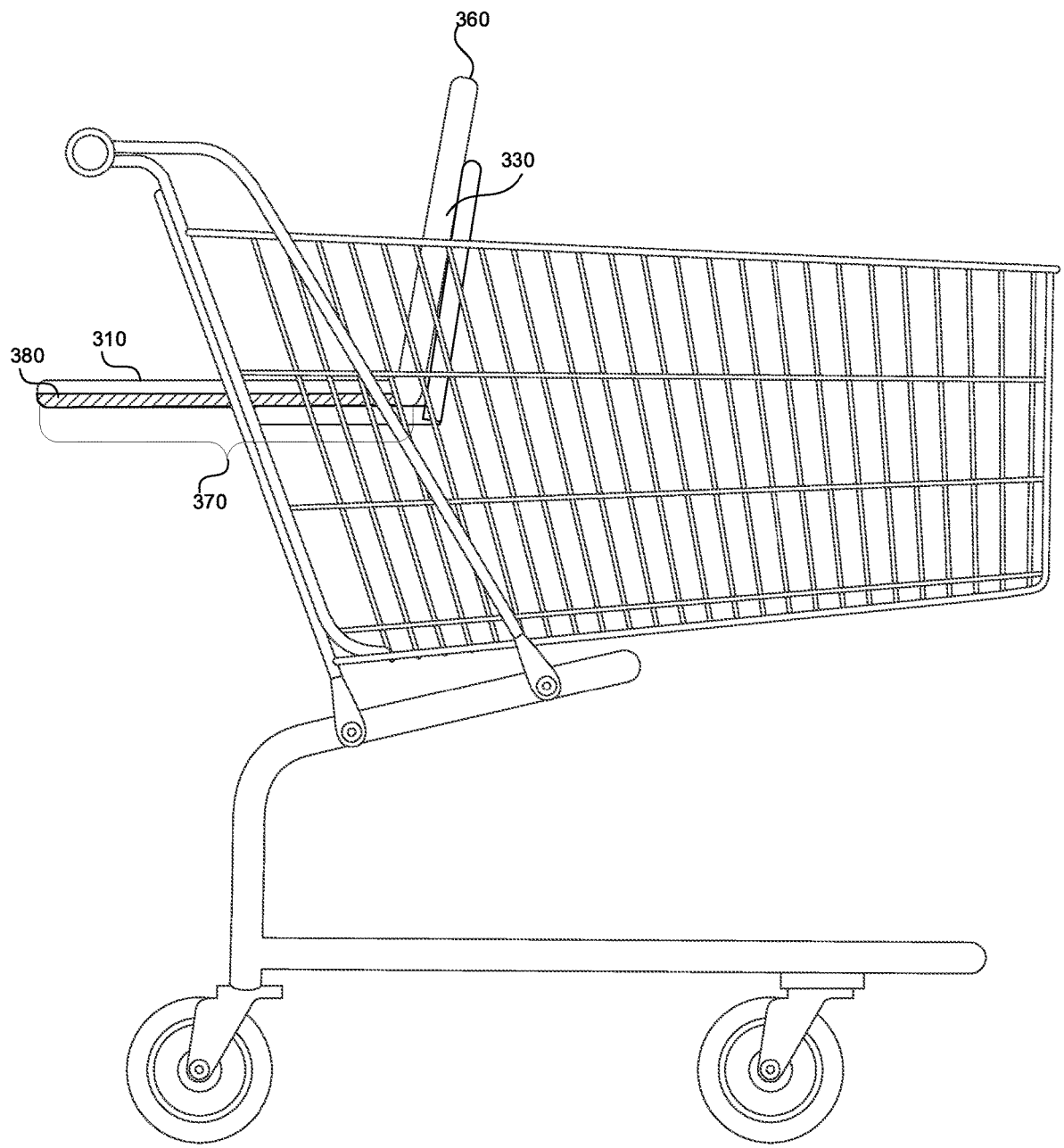
FIG. 3C shows the bottom layer of the seat cushion forming at least a part of the seat cushion's seat.

FIG. 3C shows the bottom layer 380 of the seat cushion 360 forming at least a part of the seat cushion's 360 seat 370. The seat 370 can include the two prongs 310. The bottom layer 380 can be made out of polyethylene structural foam, polyurethane structural foam, an ethyl vinyl acetate, high-density polyethylene (HDPE), etc. The bottom layer 380 can be modified as explained in FIG. 3A-3B with a thinner medial region, or a medial region made out of a softer material. The bottom layer can have a thickness of ⅛ of an inch.

Figure 4A:
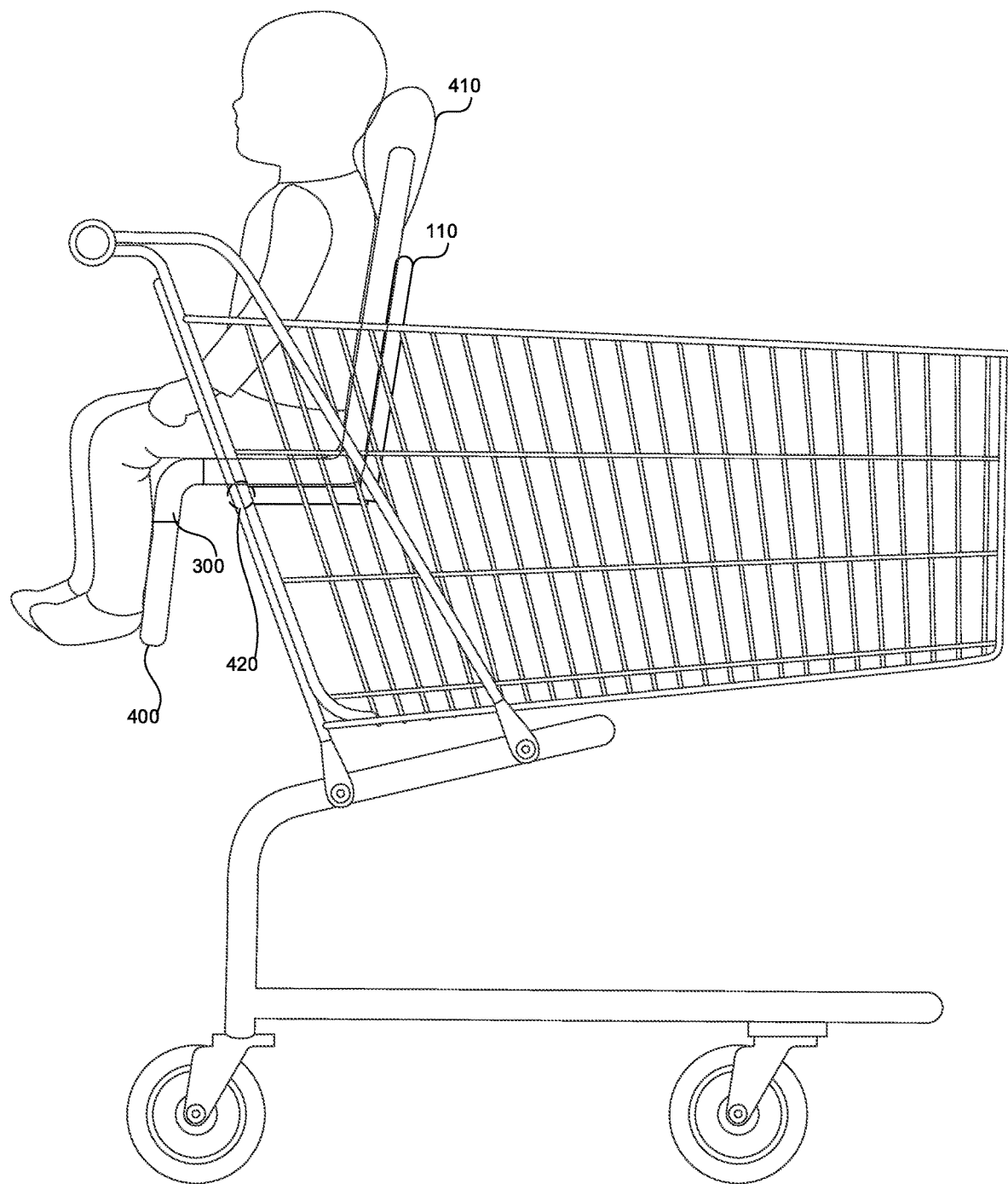
FIG. 4A shows a child seated in the seat cushion having the medial region.

FIG. 4A shows a child seated in the seat cushion having the medial region 300. The medial region 300 approximately corresponds to the position of the child's knees, and allows the medial region 300 to bend under the weight of the child's legs. As a result, the child's knees can bend up to 120° away from the horizontal, and the child's legs do not interfere with the person pushing the cart. In FIG. 4 the pivot around which the two prongs 400 bend is the medial region 300, as opposed to the pivot 420, where the seat cushion 410 meets the shopping cart seat 110. As a result, the stress on the seat cushion 410 is smaller at the pivot 420, thus reducing the likelihood of the seat cushion 410 breaking or tearing at the pivot 420.

Figure 4B:
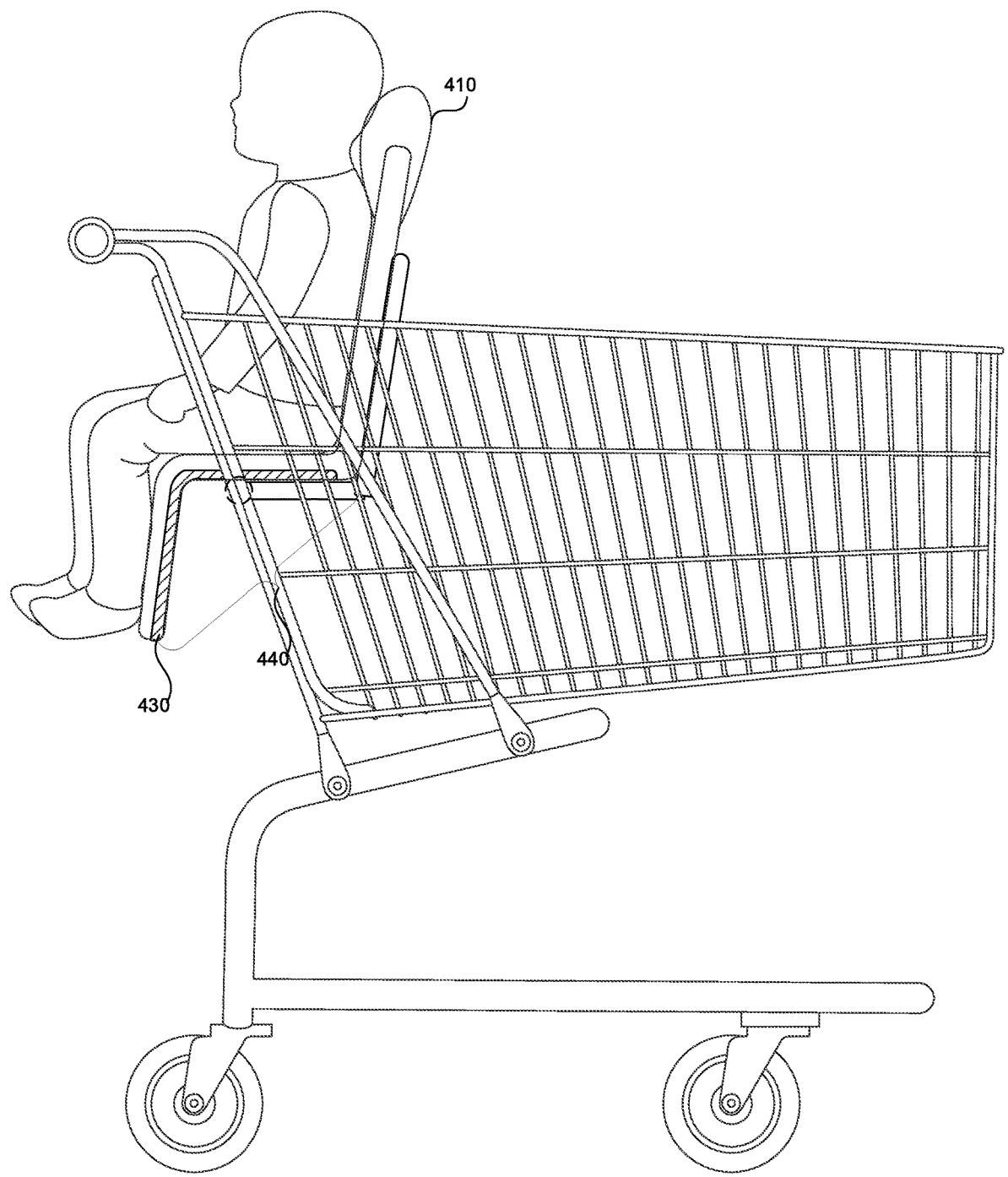
FIG. 4B shows a child seated in the seat cushion having a bottom layer forming at least a part of the seat cushion's seat.

FIG. 4B shows a child seated in the seat cushion 410 having a bottom layer 430 forming at least a part of the seat cushion's 410 seat 440. The bottom layer 430 can be firm, but bendable under the weight of the child's legs. The bottom layer 430 can bend between 0° and 120° away from horizontal position shown in FIG. 3C. The bottom layer 430 can be made out of HDPE, polyethylene structural form, polyurethane structural form, ethyl vinyl acetate, etc.

Figure 5A:
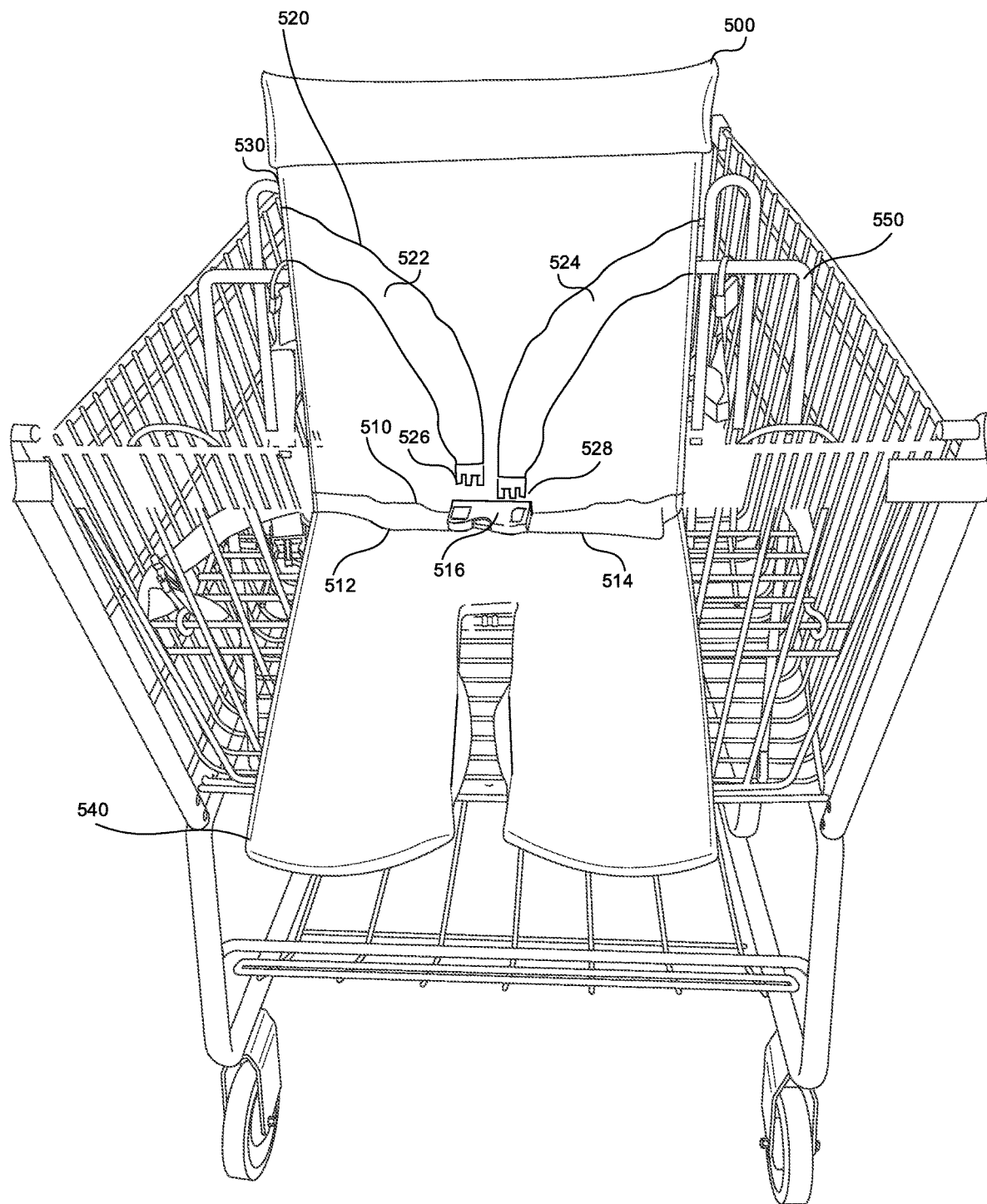
FIG. 5A shows various straps that can be part of the seat cushion.

FIG. 5A shows various straps that can be part of the seat cushion. The seat cushion 500 can include one or more straps 510, 520. Strap 510 can include a buckle 516 that connects the two bands 512, 514 to each other. Strap 510 can be secured to the juncture of the backrest 530 in the seat 540, or can be secured to the backrest 530, or the seat 540 in proximity to the juncture.

Strap 510 can serve multiple functions. Strap 510, or strap 520, can secure a child sitting in the seat cushion 500. Also, strap 510 can detachably secure the seat cushion 500 to the backrest 550 of the shopping cart, by strapping around the backrest 550. Strap 510 can also detachably secure the backrest 530 to the seat 540 when the seat cushion 500 is folded. Securing the backrest 530 the seat 540 ensures that the folded seat cushion 500 is compact and easy to carry.

Strap 520 can be used in addition to or instead of strap 510. Strap 520 can be attached to the backrest 530 (front side 532, or backside) and can be used as a shoulder strap to further secure the child sitting in the seat cushion 500. Strap 520 can include two bands 522, 524 and buckle 526, 528, which can connect to the buckle 516 of the strap 510. Similar to strap 510, strap 520 can secure the seat cushion 500 to the backrest 550 of the shopping cart by strapping around the backrest 550. Strap 520 can also secure the backrest 532 the seat 540 when the seat cushion 500 is folded.

Figure 5B:
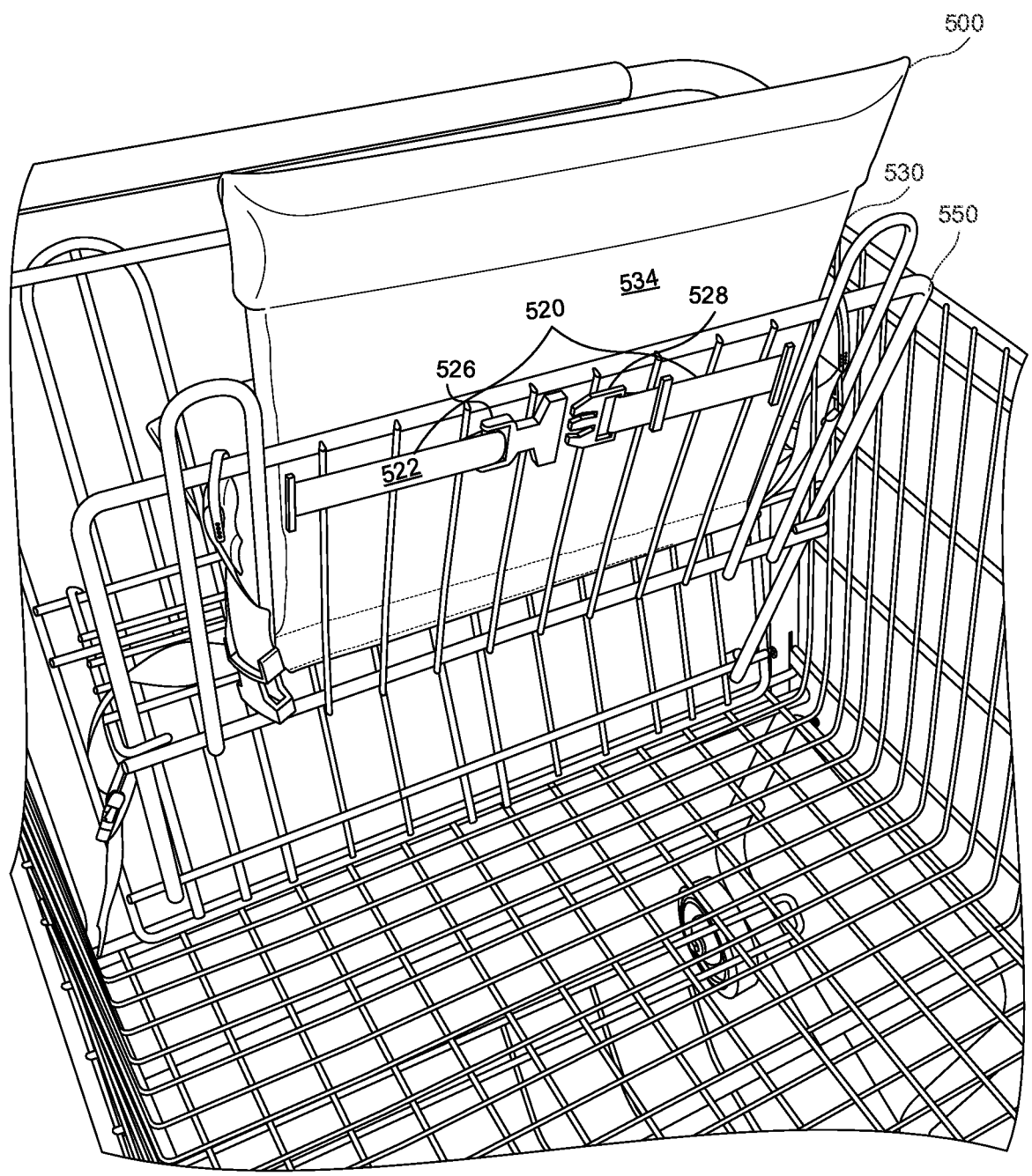
FIG. 5B shows a strap as an attachment mechanism between the seat cushion and the shopping cart.

FIG. 5B shows a strap as an attachment mechanism between the seat cushion and the shopping cart. Strap 520, including the two bands 522, 524, can wrap around the backrest 550 of the shopping cart. Securing the buckles 526, 528 to each other, strap 520 can attach the seat cushion 500 to the backrest 550 of the shopping cart. The bands 522, 524 can be secured to the backside 534 of the backrest 530 as shown in FIG. 5B, or the bands 522, 524 can be secured to the front side 532 in FIG. 5A.

Figure 6:
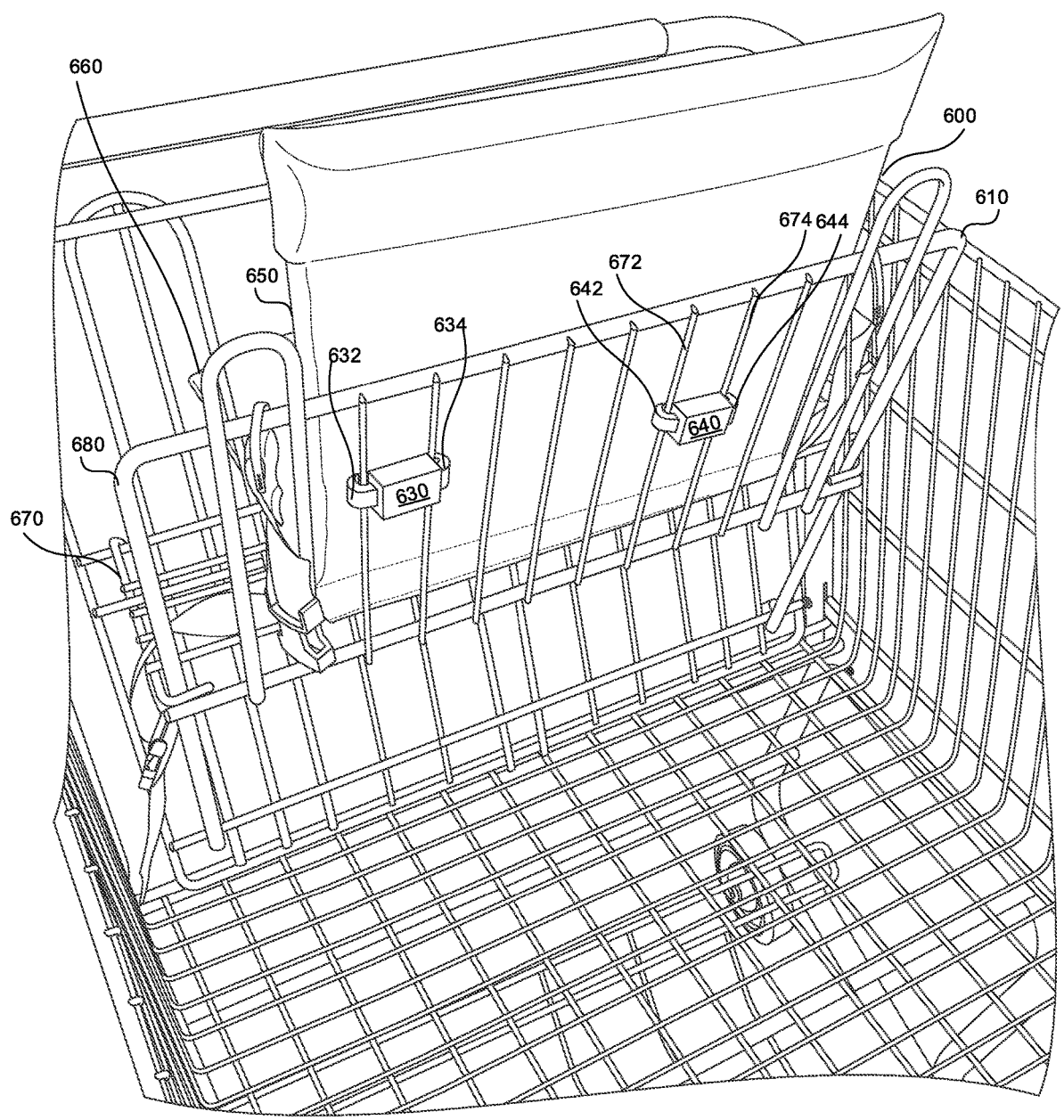
FIG. 6 shows an attachment mechanism between the seat cushion and the shopping cart.

FIG. 6 shows an attachment mechanism between the seat cushion and the shopping cart. The attachment mechanism can include one or more protrusions 630, 640 which can attach the seat and cushion 600 to the shopping cart seat 610. The protrusion 630, 640 can be attached to the backrest 650 of the seat cushion 600, and/or attached to the seat 660 of the seat cushion 600. For example, one of the protrusions can be attached to the backrest 650, while the other protrusion is attached to the seat 660.

The protrusions 630, 640 have a width that can fit between bars 672, 674 (only two labeled for brevity) of the backrest 680 of the shopping cart seat 610 and/or the seat 670 of the shopping cart seat 610. The protrusion 630, 640 can include two or more directional protrusions 632, 634, 642, 644. The directional protrusion 632, 634, 642, 644 can retract when the backrest 650 is pushed against the backrest 680 of the shopping cart seat 610. Once the directional protrusions 632, 634, 642, 644 have passed between the bars 672, 674 of the shopping cart seat 610, the directional protrusions 632, 634, 642, 644 can extend from the retracted position, and can lock to the bars 672, 674 of the backrest 680 of the shopping cart seat 610. When the directional protrusions 632, 634, 642, 644 are locked, the directional protrusions 632, 634, 642, 644 can resist separating the backrest 650 from the backrest 680 of the shopping cart seat 610.

Locking the seat cushion 600 to the shopping cart seat 610 is easy because the protrusion 630, 640 fits in the large gaps between bars 672, 674 of the shopping cart seat 610. As a result, a person can lock the seat cushion 600 onto the shopping cart seat 610 by placing the seat cushion 600 onto the shopping cart seat 610 and slightly pressing and moving the seat cushion 600 left or right until the protrusion 630, 640 passes through the bars 672, 674 and the directional protrusion 632, 634, 642, 644 locks on to the bars 672, 674.

Figure 7:
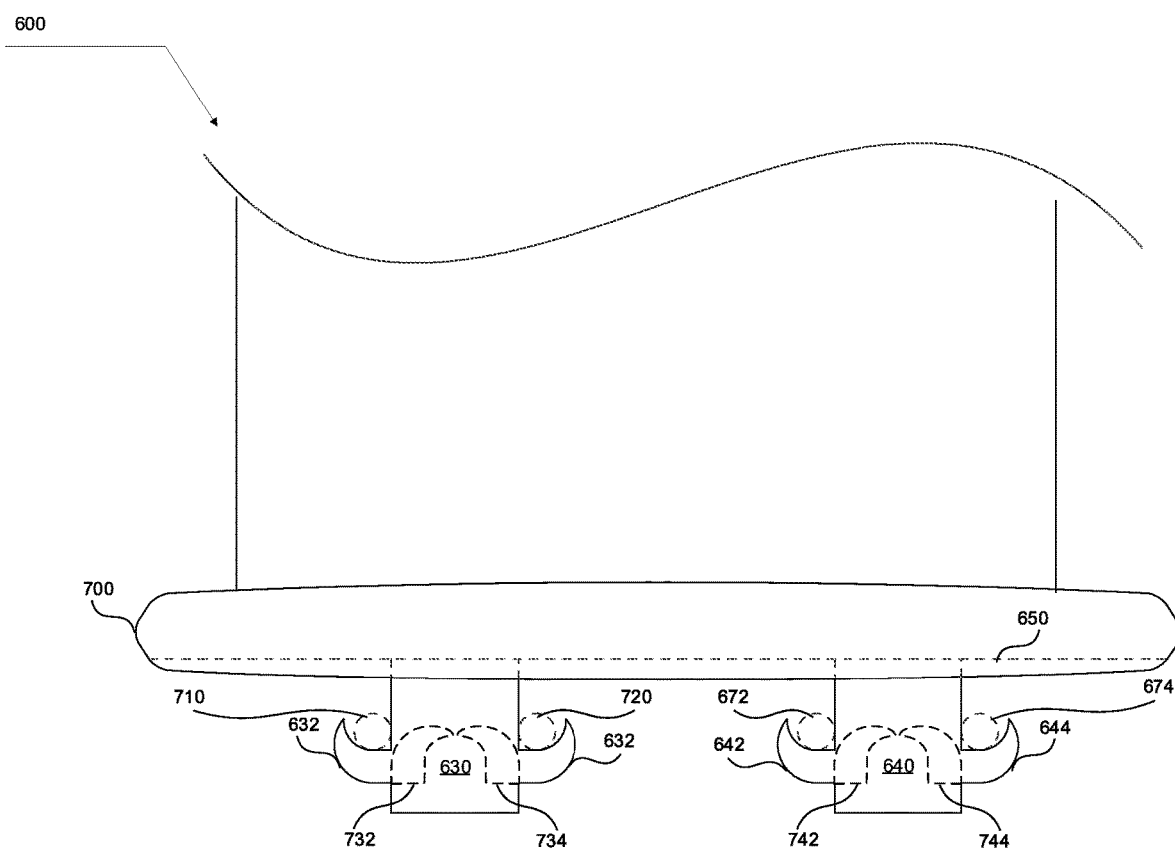
FIG. 7 is a top view of the attachment mechanism in FIG. 6.

FIG. 7 is a top view of the attachment mechanism in FIG. 6. The protrusion 630, 640 can be attached to the backrest 650 of the seat cushion 600, beneath the headrest 700. The protrusion 630, 640 can include directional protrusions 632, 634, 642, 644 which can lock onto the bars 672, 674, 710, 720. The width of the protrusion 630, 640 is slightly smaller than the distance between the bars 672, 674, 710, 720 and can be between quarter of an inch to two inches, depending on the distance between the bars 672, 674, 710, 720.

The directional protrusion 632, 634, 642, 644 can be rectangular, rectangular with rounded corners, or can be shaped like a hook, as shown in FIG. 7. The inner surface of the hook can curve toward the bars 672, 674, 710, 720 when the directional protrusion 632, 634, 642, 644 is in the locked position. The outer surface of the hook can curve away from the bars 672, 674, 710, 720 when the seat cushion 600 is not attached to the shopping cart and the directional protrusion 632, 634, 642, 644 is being pushed against the bars 672, 674, 710, 720. The curvature of the directional protrusion 632, 634, 642, 644 helps the directional protrusion 632, 634, 642, 644 to retract inside the protrusion 630, 640 and assume positions 732, 734, 742, 744, respectively.

Figure 8:
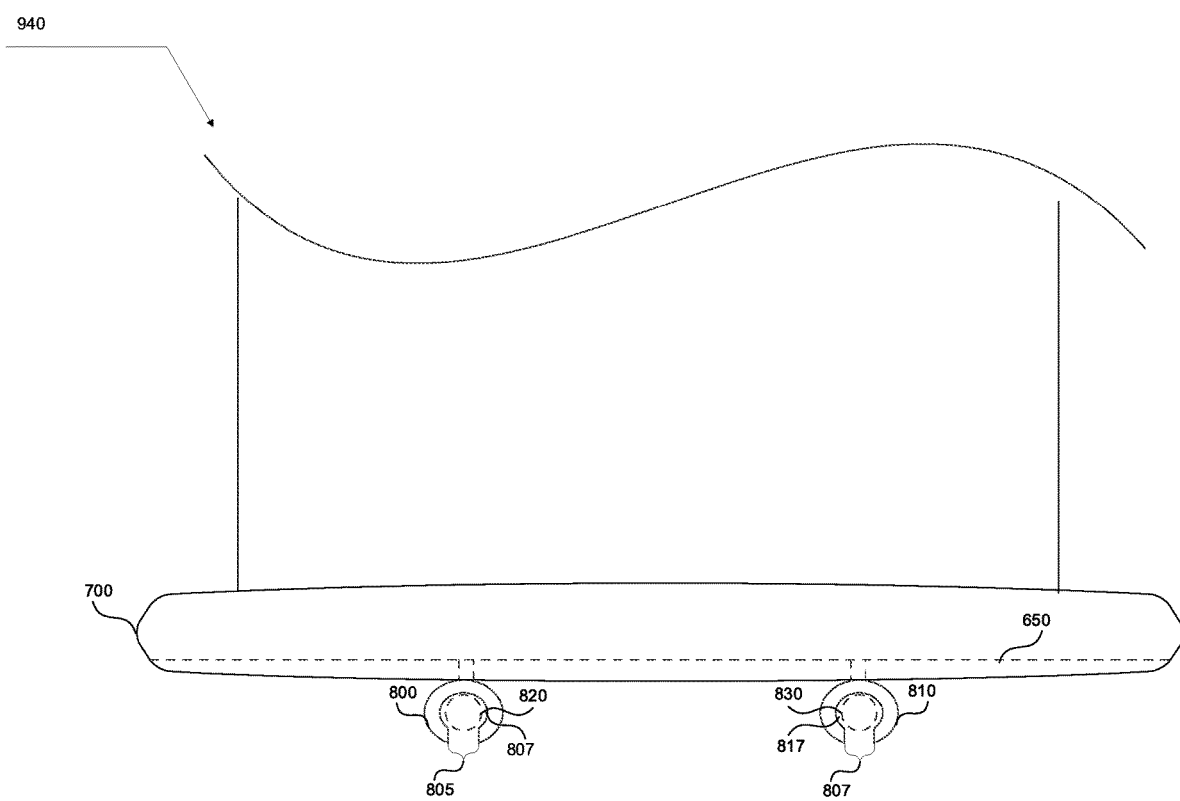
FIG. 8 is a top view of an attachment mechanism, according to another embodiment.

FIG. 8 is a top view of an attachment mechanism, according to another embodiment. The attachment mechanism can include one or more hooks 800, 810 having a hollow rounded middle 807, 817 corresponding to the size of a shopping cart bar 820, 830. The hook 800, 810 can have an opening 805, 815 at one end through which the shopping cart bar 820, 830 can be pushed. The opening 805, 815 can expand when the shopping cart bar 820, 830 pushes through the opening 805, 815. When the shopping cart bar 820, 830 is inserted into the hollow rounded middle 807, 817 of the hooks 800, 810, the hook 800, 810 goes back to its rest position, and clamps onto the shopping cart bar 820, 830.

A person placing the seat cushion 840 into the shopping cart seat needs to unfold the seat cushion 840, and slightly move the seat cushion to the left and to the right while pressing, to force the shopping cart bars 820, 830 to go through the openings 805, 815.

Figure 9:
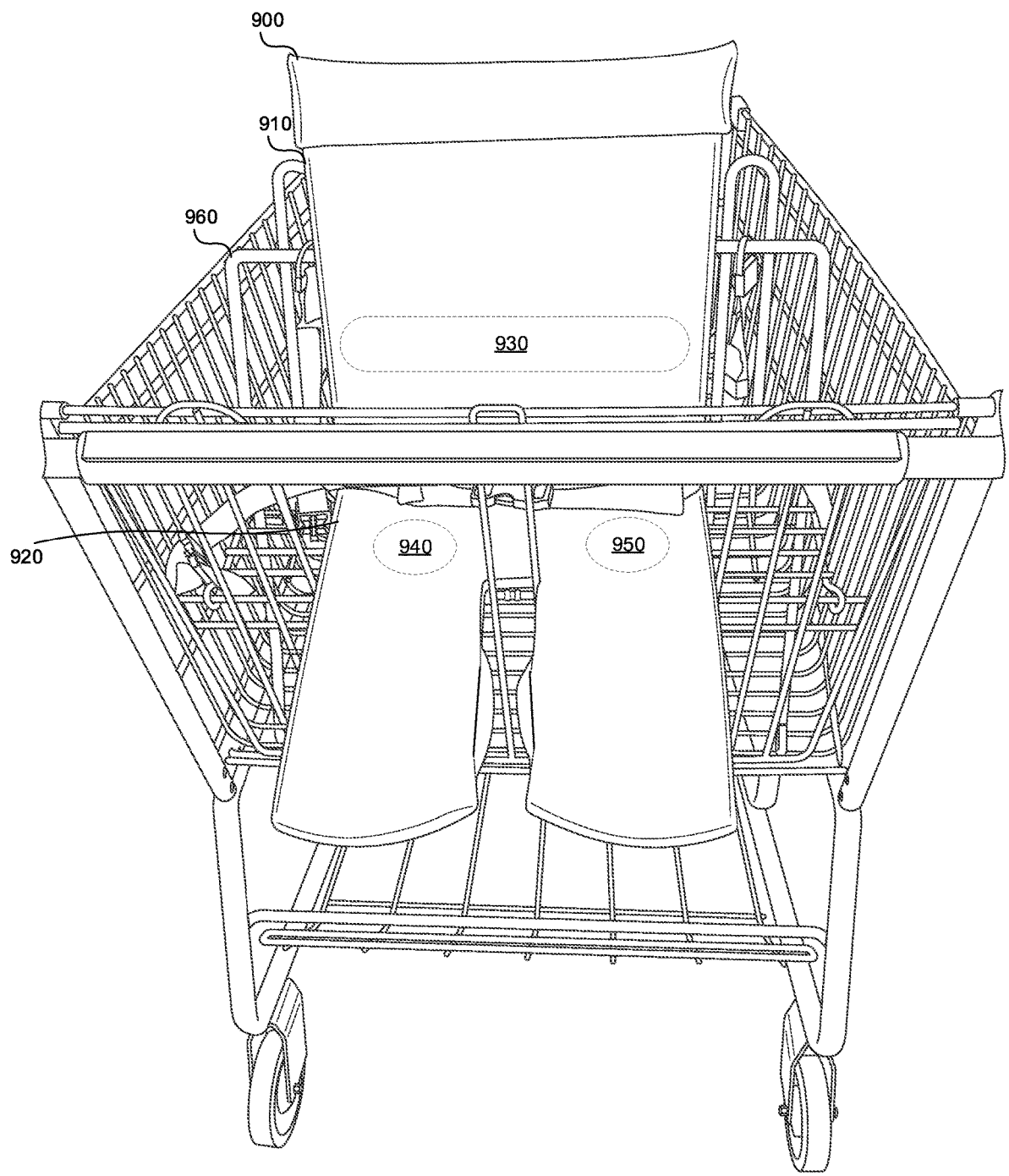
FIG. 9 shows an attachment mechanism, according to another embodiment.

FIG. 9 shows an attachment mechanism, according to another embodiment. The seat cushion 900 can include one or more magnets 930, 940, 950 in the backrest 910 of the seat cushion 900 and/or in the seat 920 of the seat cushion 900. The magnet 930, 940, 950 can take various shapes such as a rectangle, the ellipsoid, etc. The magnet 930, 940, 950 can detachably secure the seat cushion 900 to a ferromagnetic material contained in the shopping cart seat 960. In addition, the magnets 930, 940, 950 can have opposite polarity, and when the backrest 910 and the seat 920 are close to each other, the magnets 930, 940, 950 can attract, thus securing the backrest 910 to the seat 920. As a result, the seat cushion 900 takes on a compact shape and can be easily carried and stored, for example, in a diaper bag.

Figure 10:
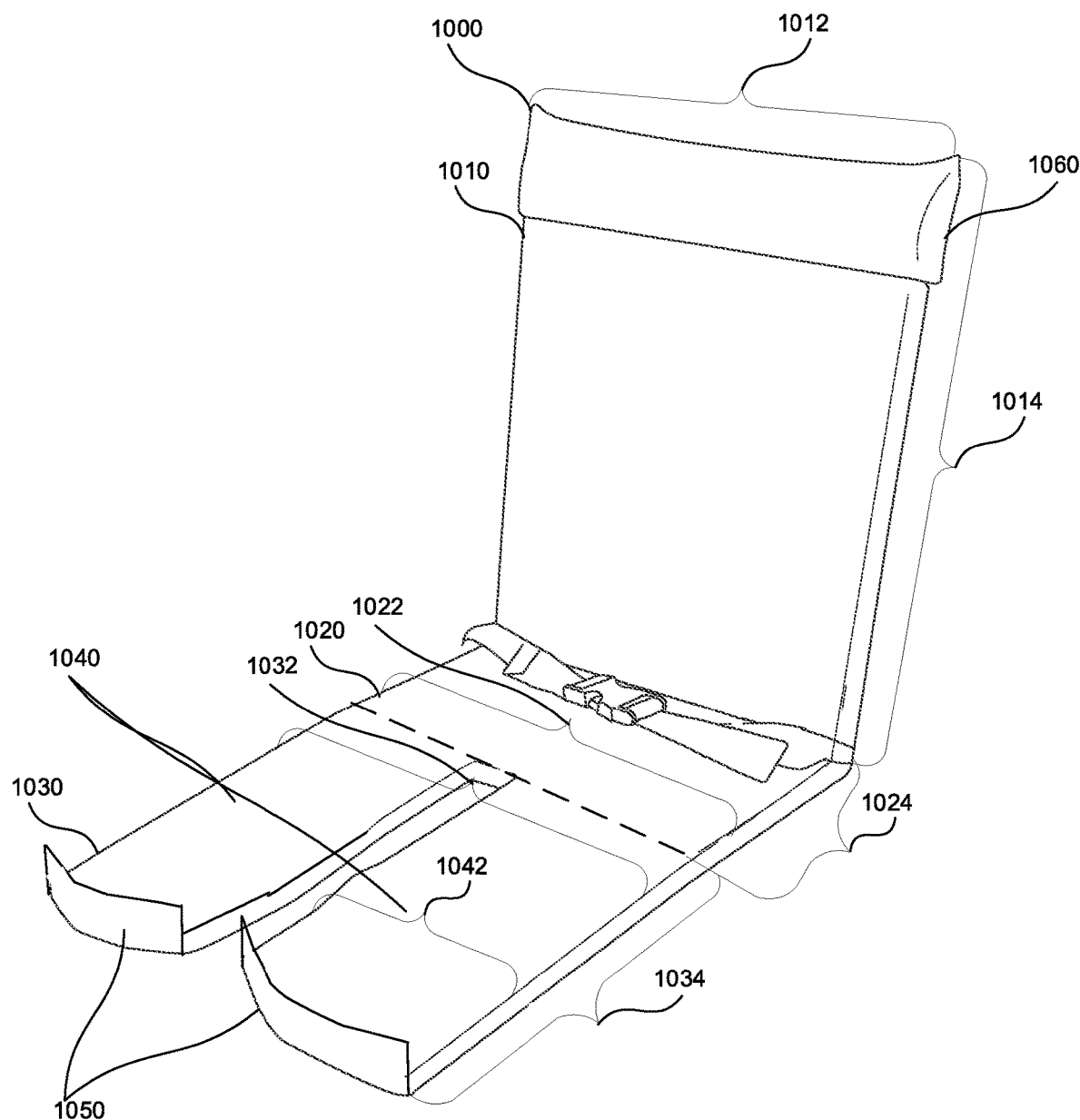
FIG. 10 shows various dimensions of the seat cushion.

FIG. 10 shows various dimensions of the seat cushion 1000. The backrest 1010 of the seat cushion 1000 can have a width 1012 between 10 inches and 14 inches inclusive, and a height 1014 between 9 inches and 14 inches inclusive. The back portion 1020 of the seat cushion 1000 can have a width 1022 between 10 inches and 14 inches inclusive, and a length 1024 between 4 inches and 6 inches inclusive. The front portion 1030 of the seat cushion 1000 can have a width 1032 between 10 inches and 14 inches inclusive, and a length 1034 between 4 inches and 9 inches inclusive. Each prong of the two prongs 1040 can have a width 1042 between 4 and 6 inches inclusive, and a length 1034 between 4 and 9 inches inclusive. In addition, the seat cushion 1000 can have an optional foot rest 1050 attached to each prong of the two prongs 1040.

The headrest 1060 can have an enlarged thickness comprising the cushioning layer and disposed on the backrest opposite the back portion of the seat. The headrest 1060 can extend between 0.5 and 2 inches above the backrest 1010. The headrest at its thickest can be up to 3 inches in thickness. The headrest 1060 can be detachable from the seat cushion 1000.

Figure 11A:
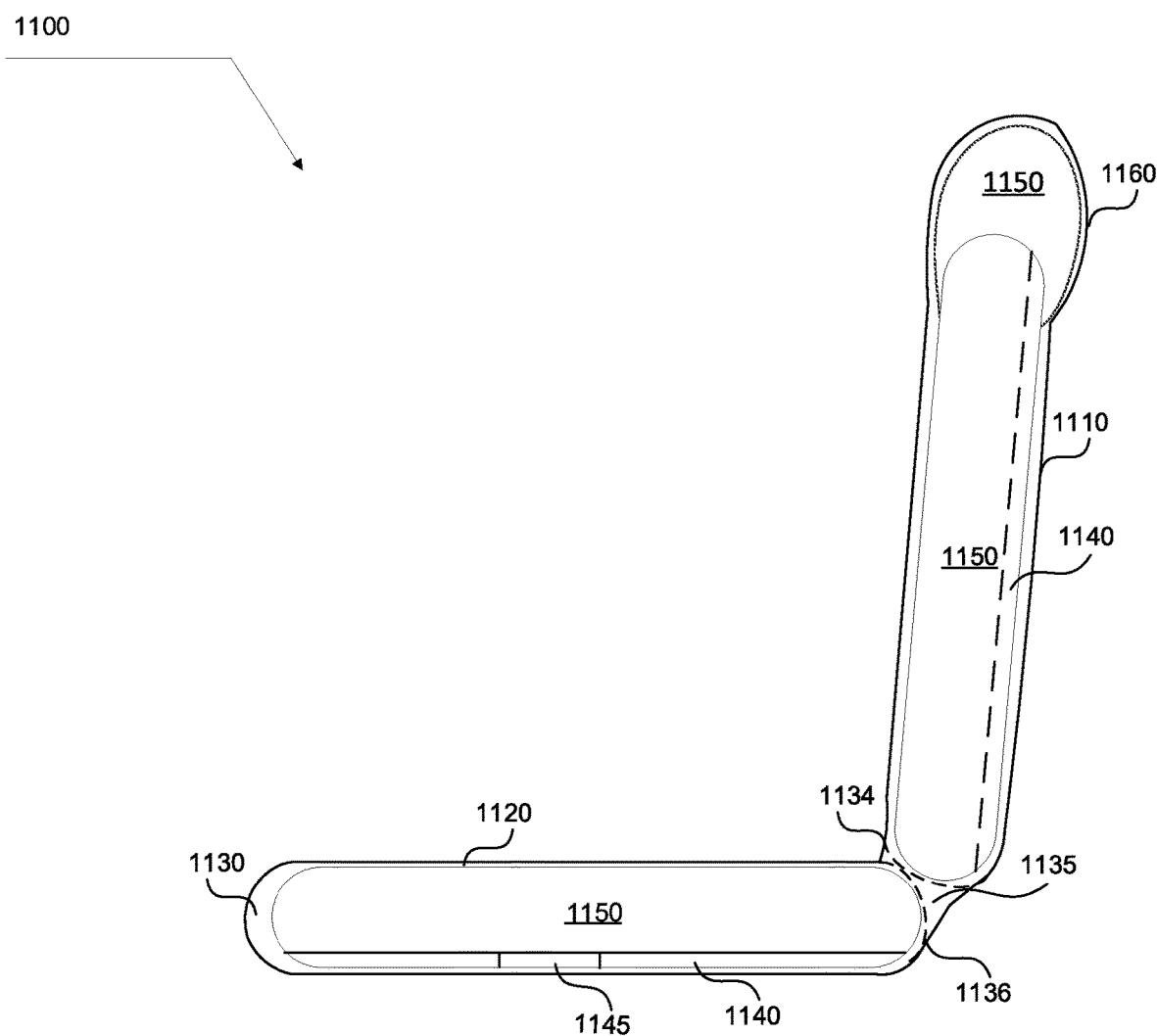
FIG. 11A shows various layers contained within the seat cushion, according to one embodiment.

FIG. 11A shows various layers contained within the seat cushion 1100, according to one embodiment. The seat cushion 1100 contains the backrest 1110, the seat 1120, and the headrest 1160, which can contain separate layers. The backrest 1110 and the seat 1120 can be jointly covered by a covering layer 1130. In some embodiments, the headrest 1160 can be included within the covering layer 1130. In other embodiments, the headrest 1160 can be detachable from the backrest 1110, and is not included within the covering layer 1130.

The covering layer 1130 can form a juncture 1135 between the seat 1120 and the backrest 1110. The juncture can be thinner than either the backrest 1110 or the seat 1120, thus enabling the backrest 1110 and the seat 1120 to fold and contact each other. The covering layer 1130 can contain stitching 1134, 1136 to separate and contain the backrest 1110 and the seat 1120, respectively. The covering layer 1130 can be water and stain resistant and can be made of vinyl coating.

In addition to the covering layer 1130, the backrest 1110 can include a cushioning layer 1150 at most half an inch in thickness disposed above the firm layer and shaped into the seating area having the two prongs. The backrest 1110 can optionally include a firm layer 1140.

In addition to the covering layer 1130, the seat 1120 can include a firm layer 1140 and a cushioning layer 1150. The firm layer can be at most quarter inch in thickness, and shaped into a seating area having the two prongs. The cushioning layer 1150 can be at most half an inch in thickness disposed above the firm layer and shaped into the seating area having the two prongs.

In addition to the covering layer 1130, the headrest 1160 can include a cushioning layer 1150 having at most 3 inches in thickness.

The cushioning layer 1150 can include at least one of a cushion high-density foam, such as the foam found in yoga mats, ethyl vinyl acetate, or a gel cushion. The firm layer can include at least one of a polyethylene structural foam, polyurethane structural foam, an ethyl vinyl acetate, HDPE, etc. As described in this application, the firm layer 1140 can include an optional medial region 1145 having different thickness and/or different material.

Figure 11B:
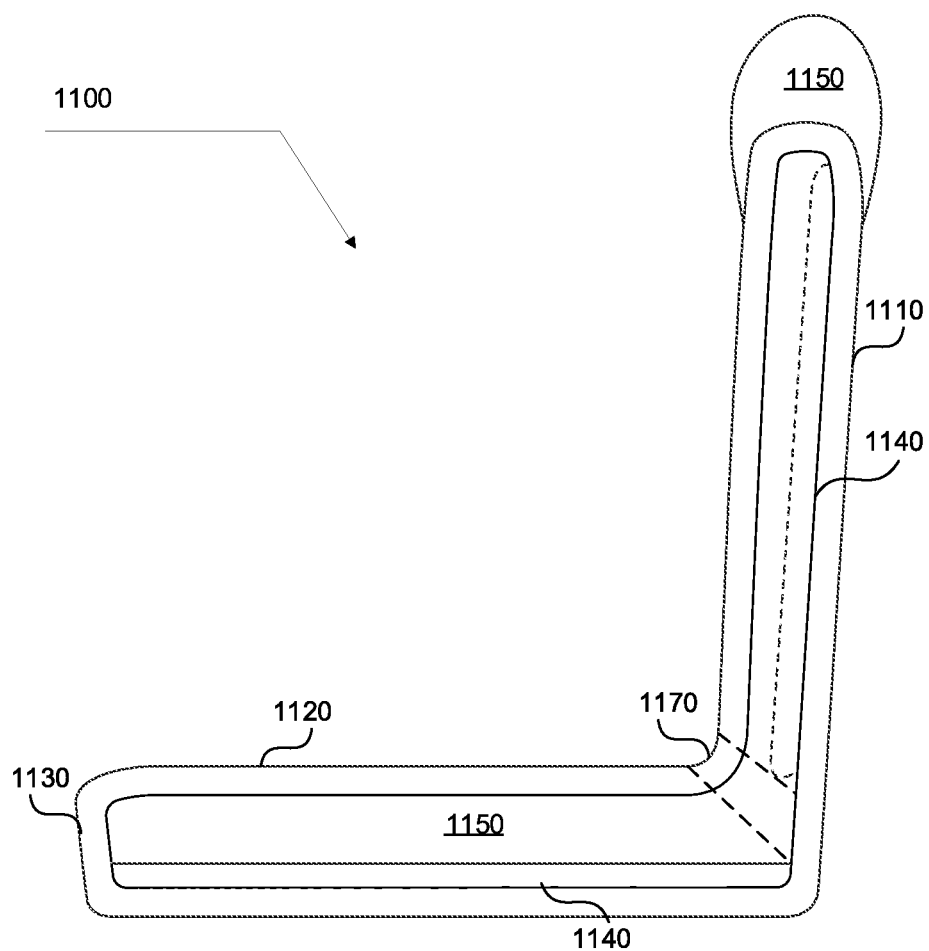
FIG. 11B shows various layers contained within the seat cushion, according to another embodiment.

FIG. 11B shows various layers contained within the seat cushion 1100, according to another embodiment. The seat cushion 1100 contains the backrest 1110, the seat 1120, and the headrest 1160, which can contain separate layers. The backrest 1110 and the seat 1120 can be jointly covered by a covering layer 1130. Unlike in FIG. 11A, the cushioning layer 1150 in FIG. 11B is continuous and forms both the backrest 1110 and the seat 1120. The firm layer 1140 can be a part of the seat 1120, and can optionally be part of the backrest 1110. The firm layer 1140 is not continuous, and the gap 1170 in the firm layer 1140, allows the seat cushion 1100 to fold on itself. Consequently, the backrest 1110, and 1120 can contact each other. The covering layer 1130 can continuously cover the backrest 1110 and the seat 1120. In some embodiments, the headrest 1160 can be included within the covering layer 1130. In other embodiments, the headrest 1160 can be detachable from the backrest 1110, and is not included within the covering layer 1130.

The covering layer 1130 can form a juncture 1135 between the seat 1120 and the backrest 1110. The juncture can be thinner than either the backrest 1110 or the seat 1120, thus enabling the backrest 1110 and the seat 1120 to fold and contact each other. The covering layer 1130 can contain stitching 1134, 1136 to contain the backrest 1110 and the seat 1120, respectively. The covering layer 1130 can be water and stain resistant and can be made of vinyl coating.

In addition to the covering layer 1130, the backrest 1110 can include a cushioning layer 1150 at most half an inch in thickness disposed above the firm layer and shaped into the seating area having the two prongs. The backrest 1110 can optionally include a firm layer 1140.

In addition to the covering layer 1130, the seat 1120 can include the firm layer 1140 at most quarter inch in thickness shaped into a seating area having the two prongs, and a cushioning layer 1150 at most half an inch in thickness disposed above the firm layer and shaped into the seating area having the two prongs.

In addition to the covering layer 1130, the headrest 1160 can include a cushioning layer 1150 having at most 3 inches in thickness.

The cushioning layer 1150 can include at least one of a cushion high-density foam, such as the foam found in yoga mats, ethyl vinyl acetate, or a gel cushion. The firm layer can include at least one of a polyethylene structural foam, polyurethane structural foam, an ethyl vinyl acetate, HDPE, etc. As described in this application, the firm layer 1140 can include an optional medial region 1145 having different thickness and/or different material.

Figure 12A:
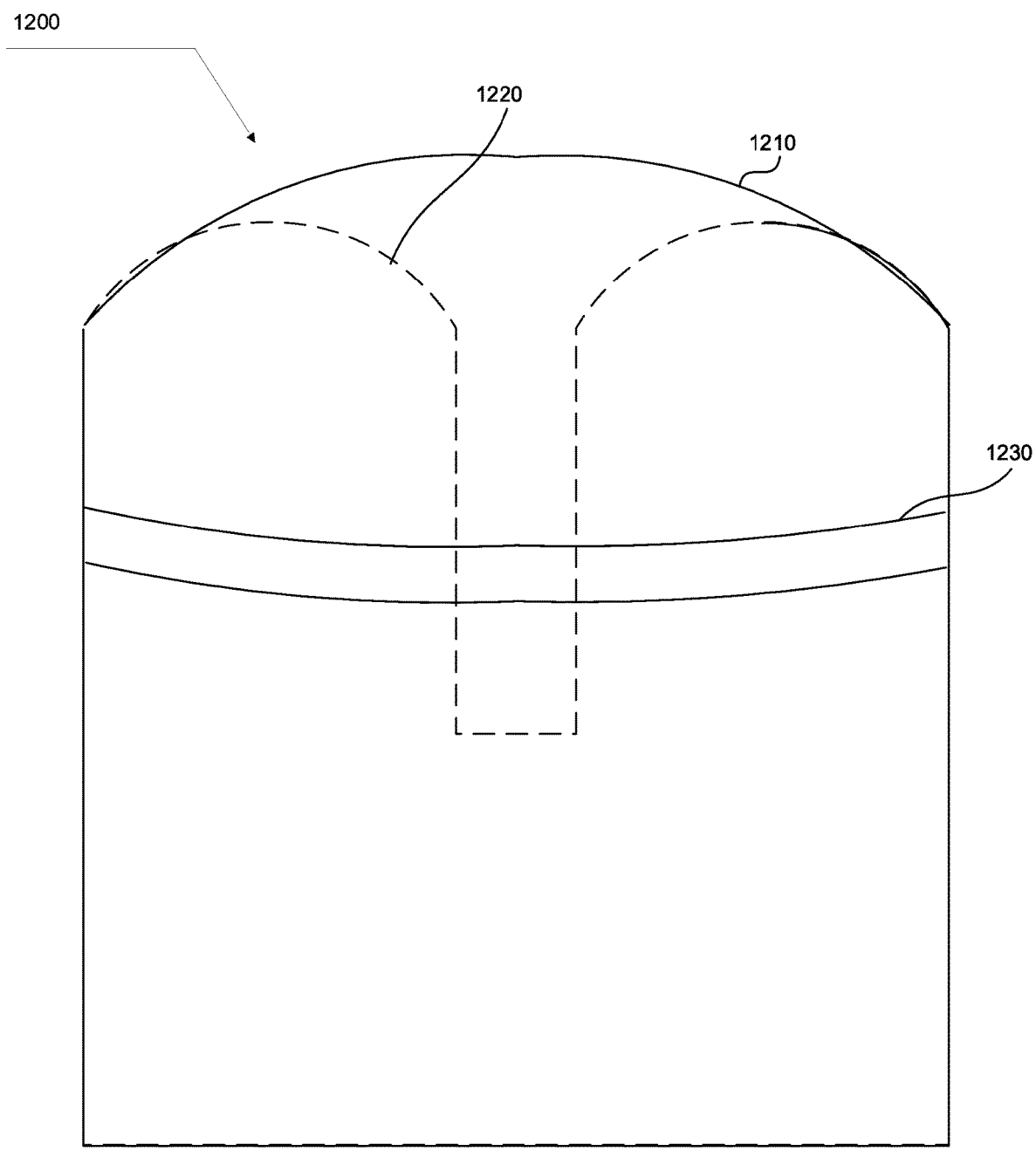
FIG. 12A shows a top view of the seat cushion folded.

FIG. 12A shows a top view of the seat cushion folded. The seat cushion 1200 can fold so that the backrest 1210 and the seat 1220 are in contact with each other. The seat 1220 and the backrest 1210 of the seat cushion 1200 can be held together using a strap, or a magnet, as described in this application. The backrest 1210 can have a pocket 1230 that can hold a book, a wallet, an electronic device, etc. while the seat cushion 1200 is being carried.

Figure 12B:
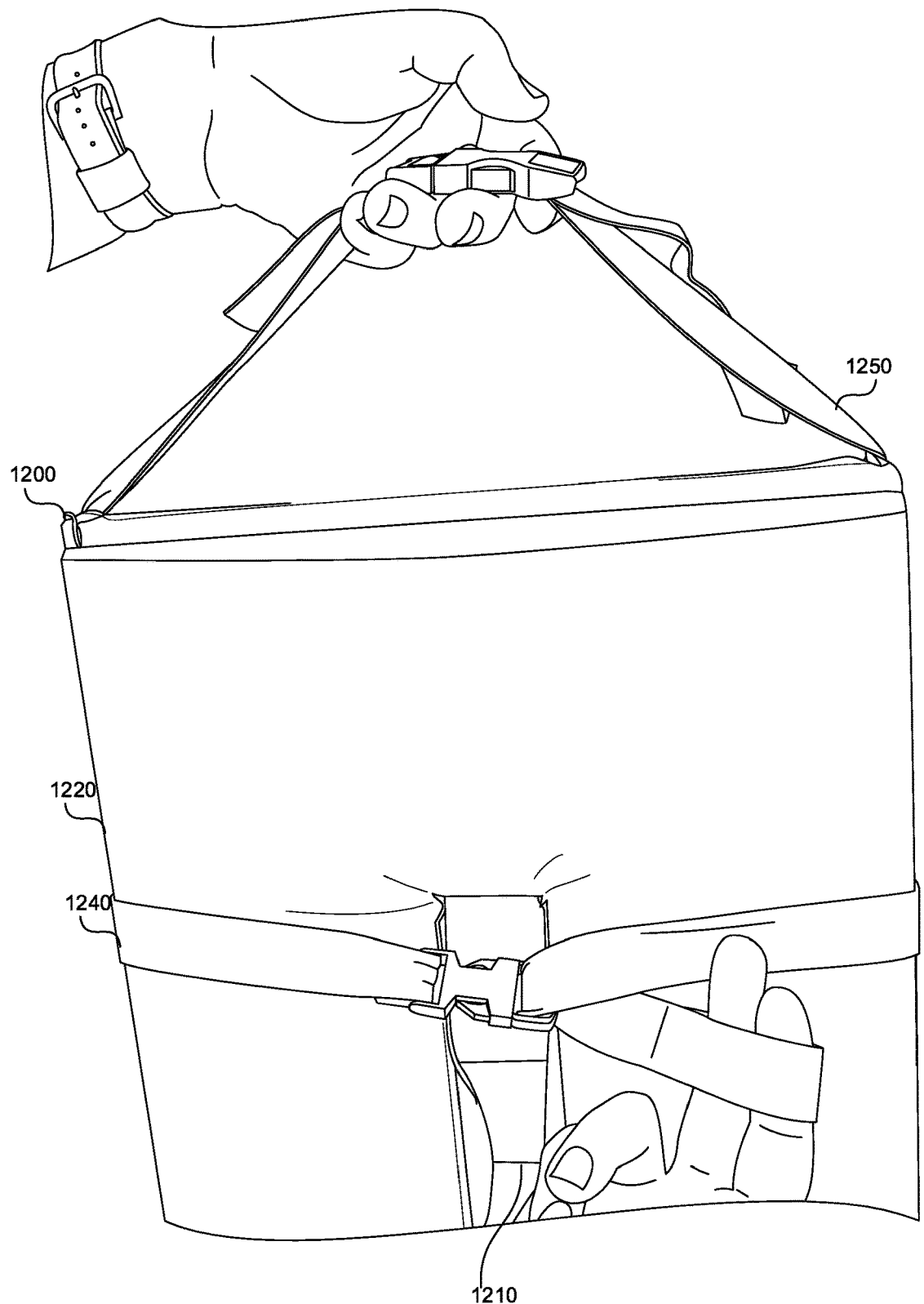
FIG. 12B shows the folded seat cushion being carried.

FIG. 12B shows the folded seat cushion being carried. The backrest 1210 and the seat 1220 can be held together using a strap 1240. The strap 1240 can be a shoulder strap, and can also be used to secure the seat cushion 1200 to the shopping cart. A strap 1250 can be used to carry the seat cushion 1200. Both straps 1240 and 1250 can have adjustable length. The strap 1250 can be buckled and strapped around a child's hips. When the strap 1250 is buckled in the opposite direction, the strap 1250 can be used to carry the seat cushion 1200, as shown in FIG. 12B.

Figure 13:
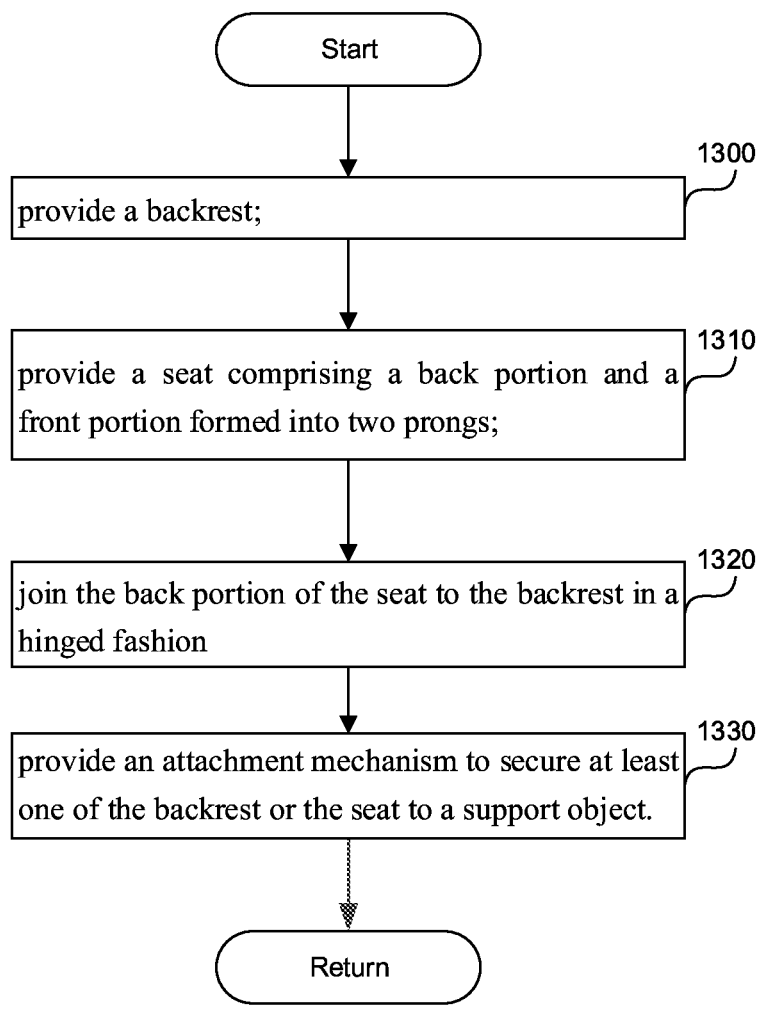
FIG. 13 is a flowchart of a method to manufacture a seat cushion.

FIG. 13 is a flowchart of a method to manufacture a seat cushion. In step 1300, a backrest can be provided. In step 1310, a seat including a back portion and a front portion formed into two prongs can be provided. In step 1320, the back portion of the seat can be joined to the backrest in a hinged fashion. For example, the back portion of the seat and the backrest can be sewn together as shown in FIG. 11. In step 1330, an attachment mechanism can be provided to secure at least one of the backrest or the seat to a support object, such as a shopping cart.

To create the backrest, and sometimes to create the seat portion, a firm layer at most quarter inch in thickness can be combined with a cushioning layer at most half an inch in thickness. The combination can be covered by a covering layer resistant to water and staining to obtain the seat. The firm layer, the cushioning layer and the covering layer can be made of various materials as described in this application.

The firm layer can be made of two materials, where a softer material forms a medial region corresponding to location of the child's knees. The first material can be injected into a mold comprising the back portion and the front portion formed into the two prongs having the medial region. The second material can be injected into the medial region of with the two prongs. The second material can be softer than the first material. The first material can be a polyethylene structural foam, polyurethane structural foam, an ethyl vinyl acetate, etc. The second material can be a softer material such as low-density polyethylene structural foam, low-density polyurethane structural foam, low-density ethyl vinyl acetate, cushion high-density foam, ethyl vinyl acetate, or a gel cushion, etc. Finally, the mold can be removed to obtain the firm layer shaped as a seat having two prongs, where the firm layer is made of two different materials.

The attachment mechanism can be added to the seat cushion. A first protrusion configured to fit between two bars of a backrest of a shopping cart seat can be provided. The first protrusion can include two or more directional protrusions, which retract when the backrest is pushed against the backrest of the shopping cart seat. The directional protrusions can extend from the retracted position when the pressure on the directional protrusions reduces, such as when the directional protrusions are pushed past the bars of the backrest. Once the directional protrusions are pushed past the bars of the backrest they can lock to the bars and can resist separating the backrest of the seat cushion from the backrest of the shopping cart when in the locked position.

Seat Cover

Figure 14:
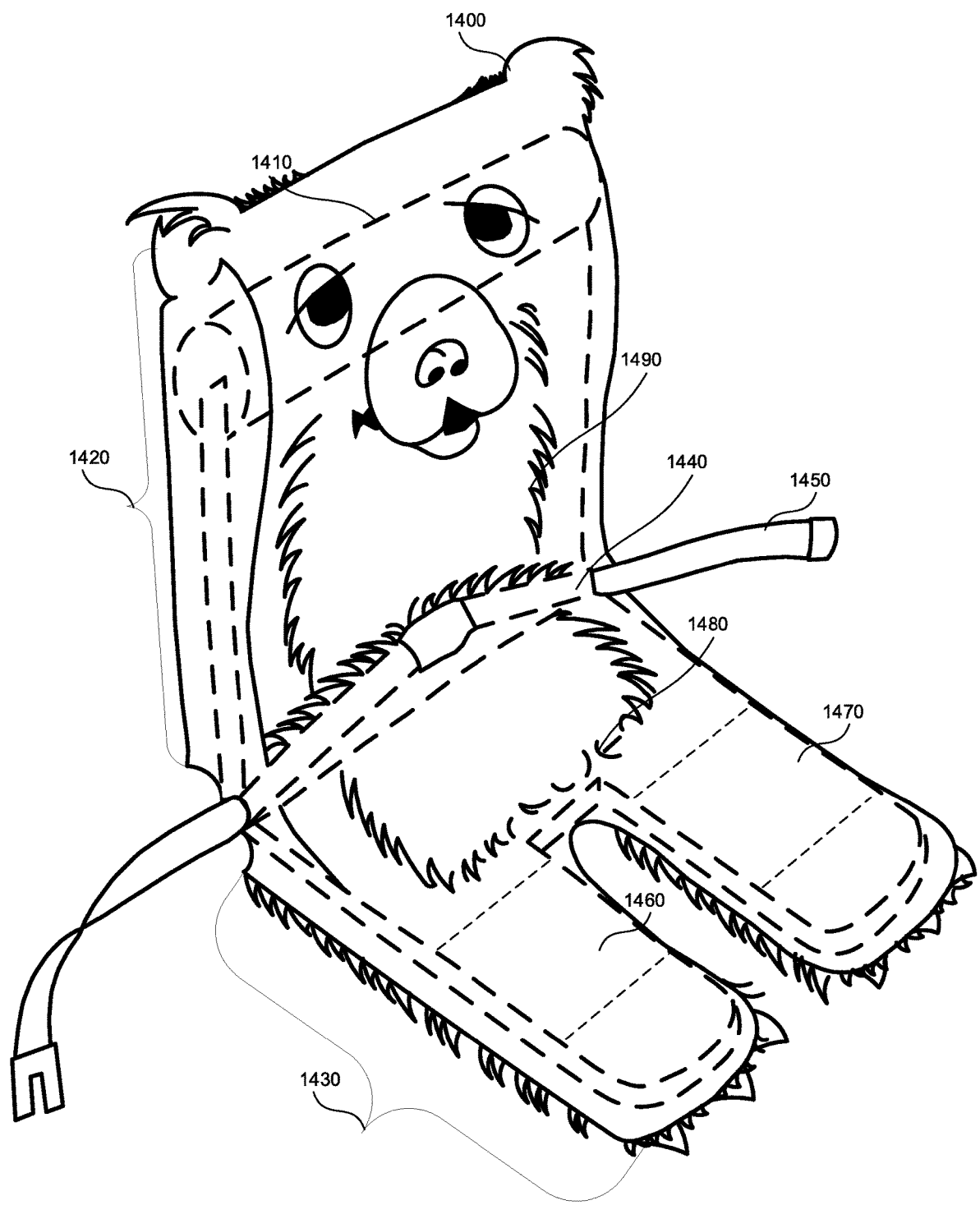
FIG. 14 shows a seat cover placed over a seat cushion.

FIG. 14 shows a seat cover placed over a seat cushion. The seat cover 1400 can be made of flexible material such as a textile or vinyl and can cover at least a seating portion of the seat cushion 1410. The seat cover 1400 can include at least two portions 1420, 1430, where the second portion 1430 is formed into two prongs, corresponding to the legs of a child seated in the seat cushion 1410.

A visual representation, such as an image, an embroidery, or additional material sewn onto the flexible material, can indicate a familiar entity, such as an animal, a person, an object, a famous character, etc. In FIG. 14, the familiar entity is a bear. The first portion 1420 of the flexible material forms a first recognizable portion of the familiar object, such as the body of the bear in FIG. 14, and the second portion 1430 of the flexible material forms a second recognizable portion of the familiar object, such as the bear's legs. The first portion 1420 and the second portion 1430 can be structural portions of the entity, such as the body and the legs when the familiar entity is an animal or a person; the first portion 1420 and the second portion 1430 can be the body and the wheels of a vehicle, respectively; the first portion 1420 and the second portion 1430 can be the head and jaws of an animal, person, famous character; etc.

The seat cover 1400 can include a third portion 1440 enveloping a strap 1450 to secure a user to the seat cushion 1410. The third portion 1440 can form a third recognizable portion of the familiar object, such as arms shown in FIG. 14, a tail, a tongue, a wing, etc. The third portion 1440 can be made out of a softer material, such as faux fur, and can cushion the seat straps to prevent them from cutting into the user sitting in the seat cushion 1410. The seat cover 1400 can include additional structures to form recognizable parts of the familiar object, such as ears, paws, claws, etc. as shown in FIG. 14. Alternatively, the seat cover 1400 can define an aperture through which the seat straps can be threaded to secure the user to the seat cushion 1410.

A friction enhancing material 1460, 1470 can be coupled to a portion of a surface of the flexible material. The friction enhancing material 1460, 1470 can be coupled to the inside surface of the flexible material, that is, the surface facing toward the seat cushion 1410. The friction enhancing material 1460, 1470 can occupy the whole inside surface of the flexible material, or it can be placed in the region, such as the two prongs shown in FIG. 14, where the user is likely to need the most friction. For example, when the user, such as a child, wants to get up from the seat cushion 1410 placed in a cart, the child is likely to put their feet in the regions corresponding to the placement of the friction enhancing material 1460, 1470, aiding a caregiver in removing the child from the seat cushion 1410. When the child puts the feet on top of the friction enhancing material 1460, 1470, the seat cover 1400 does not slide, and helps the child get up. The friction enhancing material can be liquid latex rubber, which can be applied to the flexible material in liquid form. Upon application, the liquid latex rubber can dry, thus creating the friction enhancing material 1460, 1470.

The flexible material can include a cushioning region 1480, 1490 corresponding to the seating portion of the seat cushion. The cushioning region 1480, 1490 can be made out of a soft material and can include foam and/or fur.

Figure 15A:
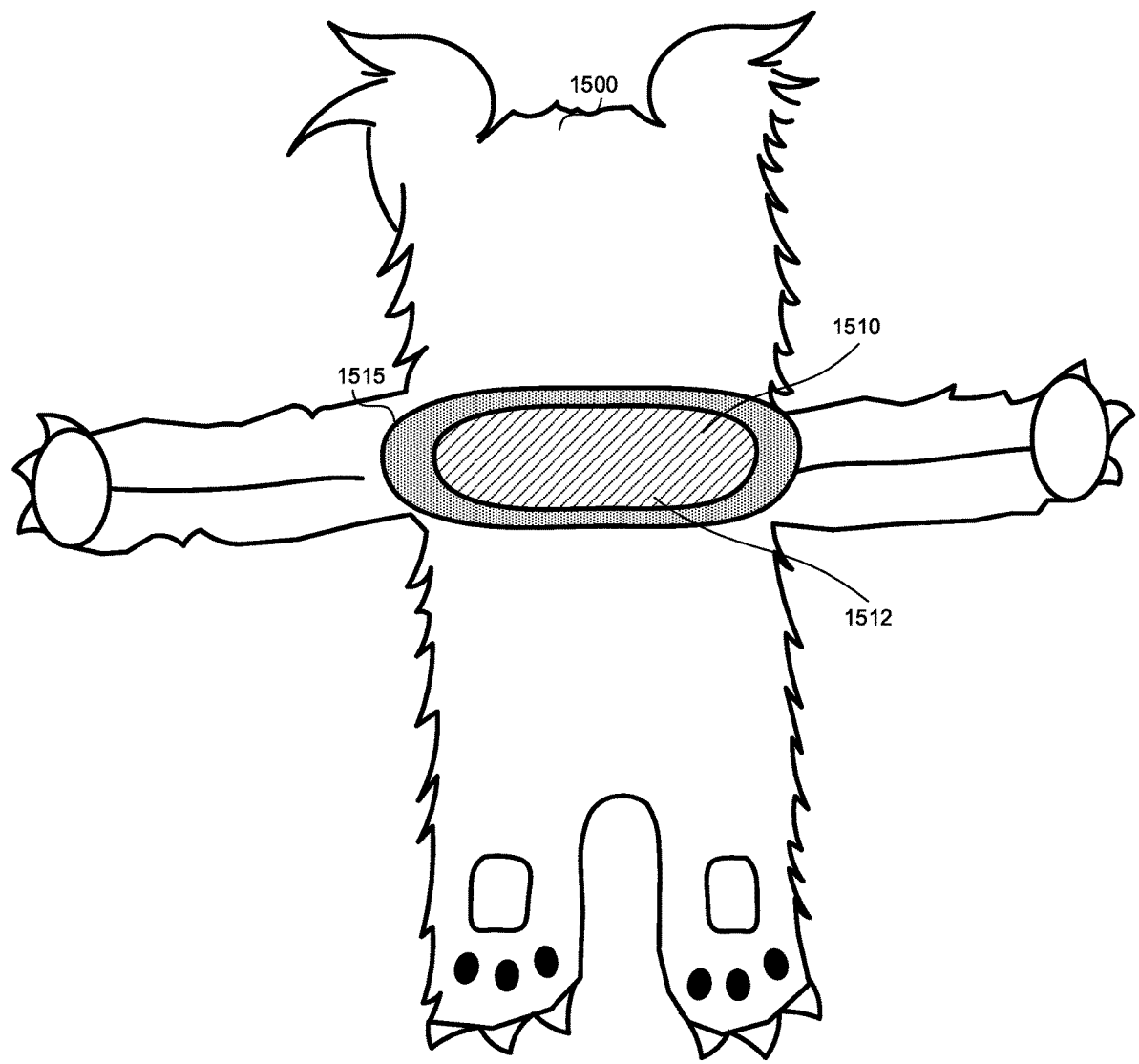
FIGS. 15A-15B show a back view of the seat cover.
Figure 15B:
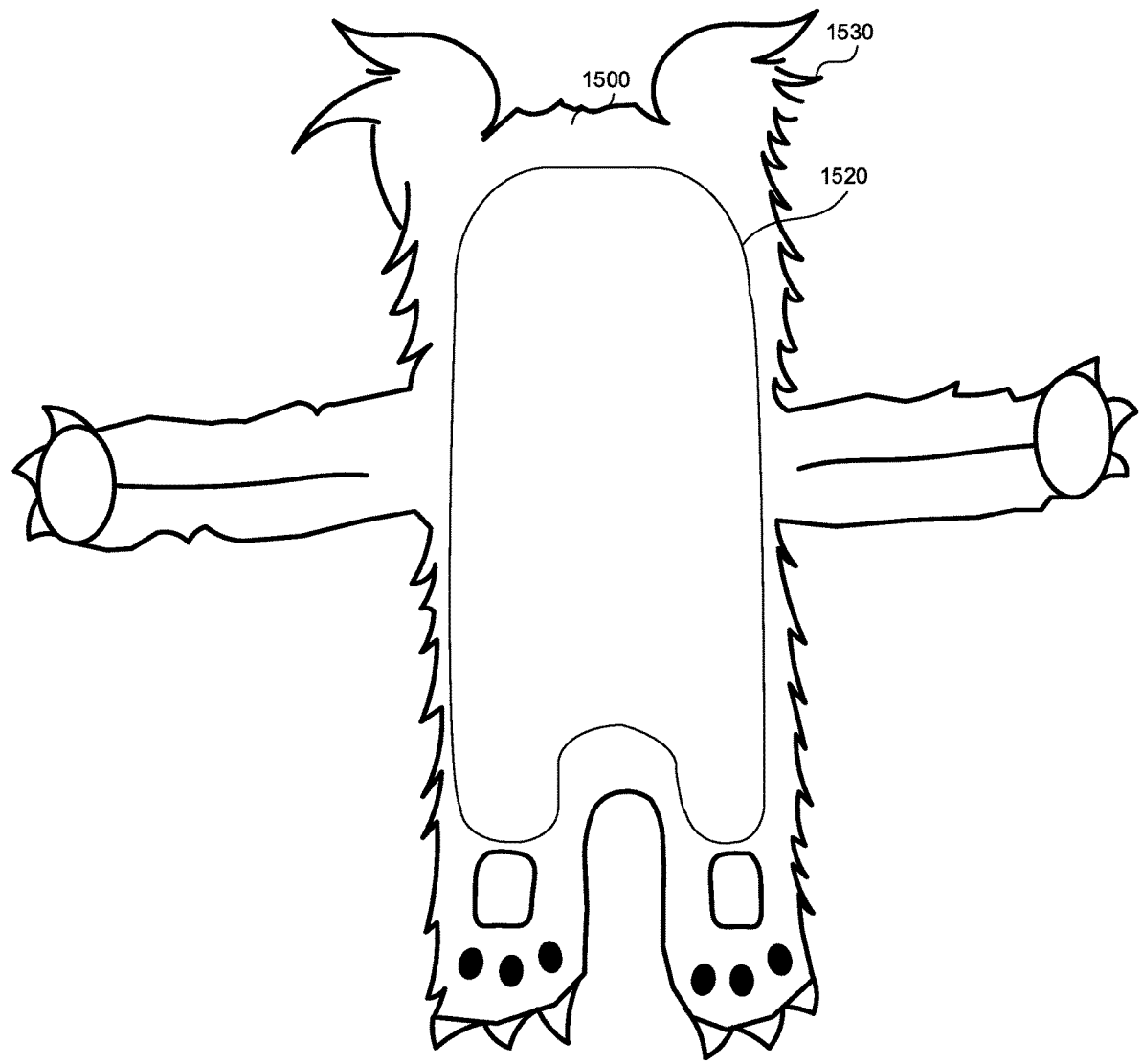

FIGS. 15A-15B show a back view of the seat cover. The seat cover 1500 can include a first attachment mechanism 1510 in FIG. 15A, 1520 in FIG. 15B to temporarily engage the seat cover 1500 to the seat cushion until the first attachment mechanism 1510 is disengaged from the seat cushion. The first attachment mechanism 1510, 1520 can include a zipper, a magnet, or a hook.

The first attachment mechanism 1510, 1520 can include an elastic tension generated by an elastic portion of the flexible material. As shown in FIG. 15B, the elastic portion of the flexible material includes an elastic band 1520 substantially tracing a perimeter 1530 of the seat cover 1500. As seen in FIG. 15B, the elastic band 1520 does not trace along the perimeter of seat cover 1500 arms, because the arms envelop the seat belts. The seat cover 1500 can be attached to the seat cushion by placing the elastic band 1520 on the backside of the seat cushion, while placing the seat cover 1500 on the front side of the seat cushion.

As shown in FIG. 15A, the seat cover 1500 can define an aperture 1512 surrounded by the elastic portion of the flexible material. The elastic portion can be the perimeter of the aperture 1512, can be a region 1515 around the aperture 1512, or the whole flexible material 1500 can be elastic. Dimensions of the aperture 1512 and the elastic portion of the flexible material enable insertion of the seat cushion into an enclosure defined by the flexible material. To insert the seat cushion, the aperture 1512 can stretch to accommodate the seat cushion and can tighten upon the seat cushion insertion. The width of the aperture can be at most the width of the seat cushion, such as 14 inches.

Figure 16:
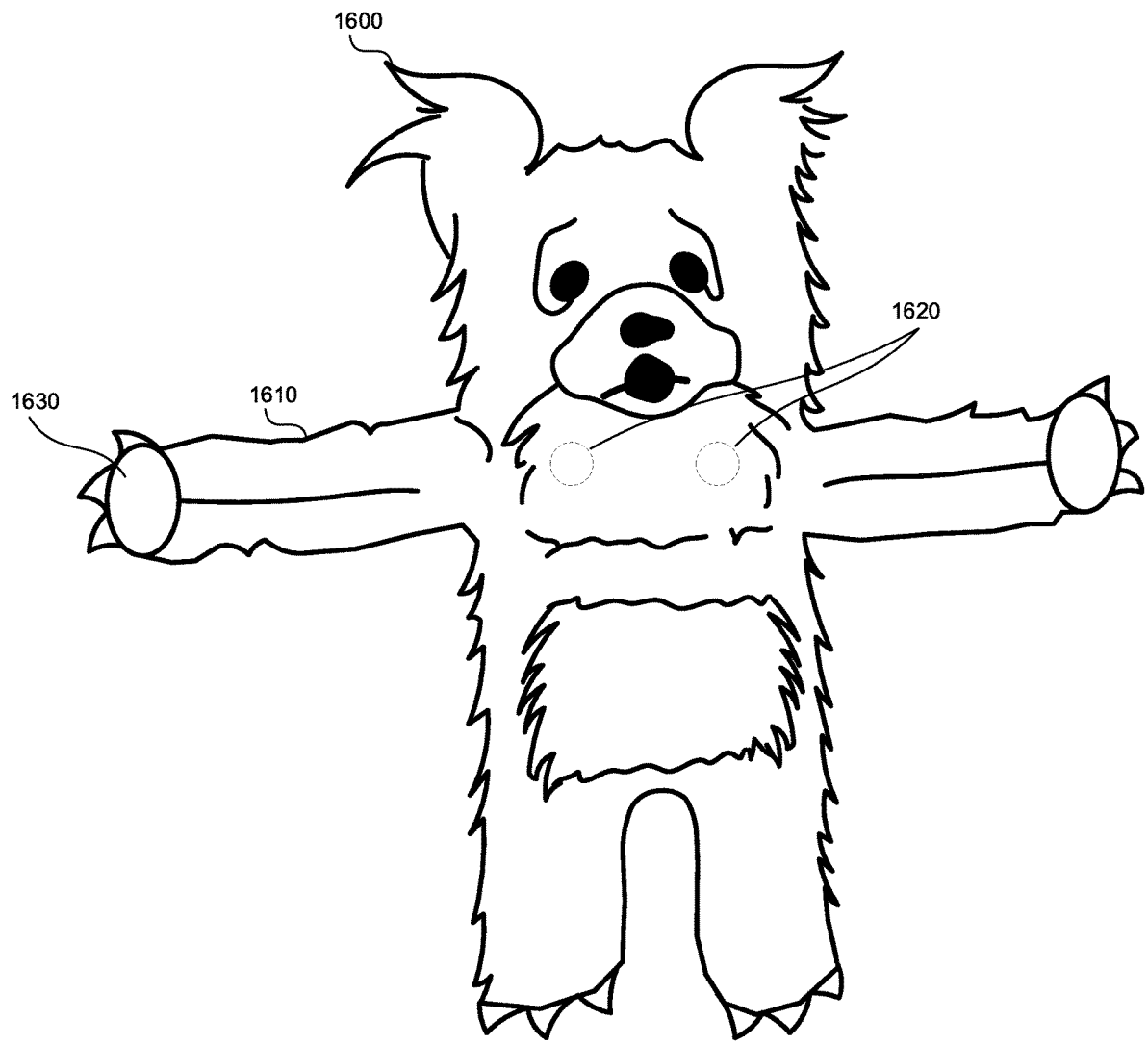
FIG. 16 shows a front view of the seat cover.

FIG. 16 shows a front view of the seat cover. The seat cover 1600 can include a conduit 1610, 1620 coupled to the flexible material and corresponding to a location of a second attachment mechanism associated with the seat cushion, such as the attachment mechanism 510, 520 in FIGS. 5A-5B; 630, 640 in FIGS. 6 and 7; 800, 810 in FIG. 8; and 930, 940, 950 in FIG. 9. The conduit 1610, 1620 can enable an operation of the second attachment mechanism by providing an aperture 1620 through which the second attachment mechanism can protrude, or by providing a pathway through which the second attachment mechanism 1450 in FIG. 14 can be threaded, such as 1440 in FIG. 14. The aperture 1620 can be positioned in the back of the seat cover 1600.

The conduit 1610 can envelop a strap to secure a user to the seat cushion. The conduit 1610 can form a recognizable portion of a familiar object, such as arms of a bear that are shown in FIG. 16. The conduit 1610 can form other recognizable portions such as an arm, a tail, a tongue, a body, a racetrack, a road, etc. The strap can be inserted through the conduit 1610, or the conduit 1610 can include an opening 1630 to enable easy insertion of the strap into the conduit 1610. The opening 1630 can be formed by a hook and loop mechanism, such as Velcro, or magnets that enable opening and closing of the conduit 1610.

The conduit 1620 can be an aperture surrounded by elastic material which enables the straps or the attachment mechanism 510, 520, 630, 640, 800, 810, 930, 940, 950 to engage with the user and/or the cart, respectively.

Figure 17:
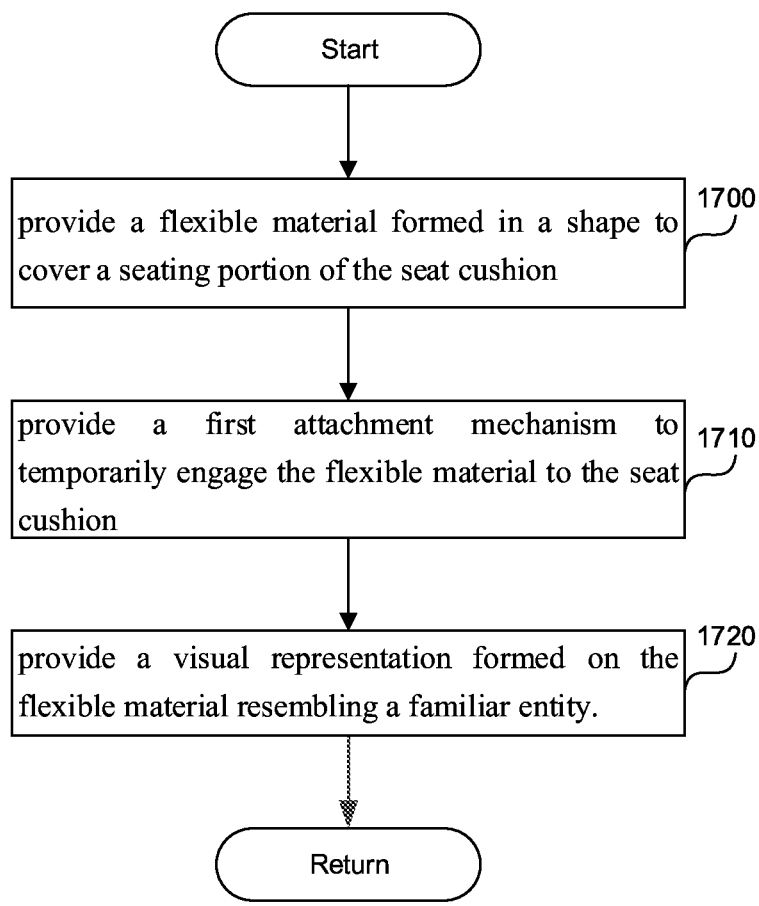
FIG. 17 is a flowchart of a method to manufacture a seat cushion.

FIG. 17 is a flowchart of a method to manufacture a seat cushion. In step 1700, a flexible material is provided. The flexible material can be formed in a shape to cover a seating portion of the seat cushion. The flexible material formed into a first portion and a second portion formed into two prongs is shown in FIG. 14. The flexible material can be elastic.

In step 1710, the first attachment mechanism can be provided. The first attachment mechanism can temporarily engage the flexible material to the seat cushion until the first attachment mechanism is disengaged from the seat cushion. The first attachment mechanism can be formed via an elastic tension generated by an elastic portion of the flexible material. The elastic portion of the flexible material can be elastic string attached to the perimeter of the seat cover. The elastic portion of the flexible material can be an elastic fabric surrounding an aperture through which the seat cushion can be inserted into the seat cover is shown in FIG. 15A.

In step 1720, a visual representation can be provided. The visual representation can be an image printed, embroidered, sewn, glued, affixed, etc., on the seat cover. The visual representation can resemble a familiar entity such as an inanimate object, an animal, a person, a plant, etc. The first portion of the flexible material can form a first recognizable portion of the familiar entity and the second portion of the flexible material forms a second recognizable portion of the familiar entity. For example, the first portion can be a character, a part of the character, a body, a body part, a part of the environment surrounding the familiar entity, while the second portion can be a different character, different part of the character, different body part, or different part of the environment surrounding the familiar entity. The seat cover, the first portion and the second portion can have dual purposes, namely to protect the seat cushion as well as to entice a user to use the seat cover and/or seat cushion.

A friction enhancing material can be coupled to an inside surface of the flexible material, facing toward the seat cushion. The friction enhancing material can enable the child to climb out of the seat cushion without sliding.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A seat cover comprising:
a flexible material formed as a slipcover configured to cover a seating portion and a backrest portion of a seat cushion,
the flexible material formed into a first portion and a second portion formed into two prongs,
the flexible material including a front side and a back side;
a first attachment mechanism configured to temporarily engage the flexible material to the seat cushion until the first attachment mechanism is disengaged from the seat cushion,
the first attachment mechanism formed on the back side of the flexible material;
a conduit formed on the back side of the backrest portion of the flexible material corresponding to a location of a second attachment mechanism coupled to the seat cushion, the conduit configured to receive the second attachment mechanism therethrough,
the second attachment mechanism configured to secure the seat cushion to a shopping cart,
the conduit enabling an operation of the second attachment mechanism; and
a visual representation formed on the front side of the flexible material comprising a personified entity wherein the first portion of the flexible material forms a first recognizable portion of the personified entity and the second portion of the flexible material forms a second recognizable portion of the personified entity.

2. The seat cover of claim 1, wherein the conduit comprises an aperture enabling securing a user to the seat cushion or the seat cushion to a seat.

3. An apparatus comprising:
a flexible material formed as a slipcover configured to cover a seating portion and a backrest portion of a seat cushion, the flexible material formed into a first portion and a second portion formed into two prongs,
the flexible material including a front side and a back side;
a first attachment mechanism configured to temporarily engage the flexible material to the seat cushion until the first attachment mechanism is disengaged from the seat cushion,
the first attachment mechanism formed on the back side of the flexible material;
a conduit formed on the back side of the backrest portion of the flexible material corresponding to a location of a second attachment mechanism coupled to the seat cushion, the conduit configured to receive the second attachment mechanism therethrough,
the second attachment mechanism configured to secure the seat cushion to a shopping cart; and
a visual representation formed on the front side of the flexible material comprising a personified entity wherein the first portion of the flexible material forms a first recognizable portion of the personified entity and the second portion of the flexible material forms a second recognizable portion of the personified entity.

4. The apparatus of claim 3, the visual representation comprising an image, an embroidery, or a material sewn onto the flexible material.

5. The apparatus of claim 3, comprising a cushioning region corresponding to the seating portion of the seat cushion coupled to the flexible material.

6. The apparatus of claim 3, a third portion coupled to the flexible material and enveloping a strap to secure a user to the seat cushion, the third portion forming a third recognizable portion of the personified entity.

7. The apparatus of claim 6, the third portion comprising a third attachment mechanism to enable opening of the third portion thereby enabling insertion and extraction of the strap.

8. The apparatus of claim 3, comprising an aperture formed within the flexible material corresponding to a location of a second attachment mechanism coupled to the seat cushion, the aperture enabling an operation of the second attachment mechanism.

9. The apparatus of claim 3, the first attachment mechanism comprising an elastic tension generated by an elastic portion of the flexible material.

10. The apparatus of claim 9, wherein the elastic portion of the flexible material comprises an elastic band coupled to the flexible material along a perimeter of the flexible material.

11. The apparatus of claim 9, the flexible material comprising an aperture surrounded by the elastic portion of the flexible material, dimensions of the aperture and the elastic portion of the flexible material enabling insertion of the seat cushion into an enclosure defined by the flexible material.

12. The apparatus of claim 11, a width of the aperture at most 14 inches.

13. The apparatus of claim 3, the first attachment mechanism comprising a zipper, a magnet, or a hook.

14. The apparatus of claim 3, comprising a friction enhancing material coupled to a portion of a surface of the flexible material, the surface of the flexible material facing toward the seat cushion.

15. The apparatus of claim 14, the friction enhancing material comprising liquid latex rubber.

16. A method comprising:
providing a flexible material formed as a slipcover configured to cover a seating portion and a backrest portion of a seat cushion, the flexible material formed into a first portion and a second portion formed into two prongs,
the flexible material including a front side and a back side;
providing a first attachment mechanism configured to temporarily engage the flexible material to the seat cushion until the first attachment mechanism is disengaged from the seat cushion,
the first attachment mechanism formed on the back side of the flexible material;
providing a conduit formed on the back side of the backrest portion of the flexible material corresponding to a location of a second attachment mechanism coupled to the seat cushion, the conduit configured to receive the second attachment mechanism therethrough,
the second attachment mechanism configured to secure the seat cushion to a shopping cart; and providing a visual representation formed on the front side of the flexible material resembling a personified entity wherein the first portion of the flexible material forms a first recognizable portion of the personified entity and the second portion of the flexible material forms a second recognizable portion of the personified entity.

17. The method of claim 16, comprising providing the first attachment mechanism comprising an elastic tension generated by an elastic portion of the flexible material.

18. The method of claim 17, said providing the first attachment mechanism comprising:
providing the flexible material comprising an aperture surrounded by the elastic portion of the flexible material, dimensions of the aperture and the elastic portion of the flexible material enabling insertion of the seat cushion into an enclosure defined by the flexible material.

19. The method of claim 16, comprising providing a friction enhancing material coupled to an inside surface of the flexible material, the inside surface of the flexible material facing toward the seat cushion.

* * * * *